United States Patent [19]
Hashimoto et al.

[11] Patent Number: 5,331,555
[45] Date of Patent: Jul. 19, 1994

[54] ELECTRONIC APPARATUS

[75] Inventors: Katsuhiko Hashimoto, Souraku; Nobutaka Takahashi, Nara, both of Japan

[73] Assignee: Sharp Kabushiki Kaisha, Osaka, Japan

[21] Appl. No.: 697,678

[22] Filed: May 9, 1991

[30] Foreign Application Priority Data

May 11, 1990 [JP] Japan .................. 2-121789
Jun. 1, 1990 [JP] Japan .................. 2-145037
Jun. 1, 1990 [JP] Japan .................. 2-145038

[51] Int. Cl.⁵ ............................. G06F 15/38
[52] U.S. Cl. ............................. 364/419.07
[58] Field of Search .......... 364/419, 419.07, 419.1, 364/149.13

[56] References Cited

U.S. PATENT DOCUMENTS 4,996,665  2/1991  Nomura ................. 395/600
5,185,698  2/1993  Hesse et al. .......... 364/419.1

FOREIGN PATENT DOCUMENTS 0219197    4/1987   European Pat. Off. .
0364099    4/1990   European Pat. Off. .
62-138927  of 0000  Japan .
59-148944  of 0000  Japan .
62-259166  of 0000  Japan .
62-099829  10/1987  Japan .
2043311    10/1980  United Kingdom .

OTHER PUBLICATIONS

IEEE Transactions On Software Engineering, vol. SE-12, No. 3, Mar. 1986, New York US, pp. 417–435.
Patent Abstracts of Japan, vol. 13, No. 452 & JP-A-11 75 663 (NEC).

Primary Examiner—Robert A. Weinhardt
Assistant Examiner—Xuong Chung
Attorney, Agent, or Firm—Nixon & Vanderhye

[57] ABSTRACT

An object of the invention is to improve the operability and ease of use of electronic apparatus generally known as electronic notebooks used for storing and displaying textual data and other data entered thereto. The electronic apparatus facilitates effective creation of text having a hierarchical structure. The electronic apparatus enables data search to be performed between a plurality of different modes each controlling specific data without repeatedly entering a search character string. Also, with the electronic apparatus, when entering data identical to data already entered, the data can be entered by a simple key operation using the already entered data.

8 Claims, 37 Drawing Sheets

Fig. 9D

93
◆FACSIMILE BROADCAST RECEIVER
 ◇PREFACE
 ◇EXPERIMENTAL SPECIFICATION OF DIGITAL FACSIMILE BROADCAST
 ◇PROTOTYPE FACSIMILE BROADCAST RECEIVER USED FOR
   EVALUATION OF RECEPTION CHARACTERISTICS
 ◇CONCLUSION

Fig. 9E

94
◆FACSIMILE BROADCAST RECEIVER
 ◇PREFACE
 ◇EXPERIMENTAL SPECIFICATION OF DIGITAL FACSIMILE BROADCAST
 ◇PROTOTYPE FACSIMILE BROADCAST RECEIVER USED FOR
   EVALUATION OF RECEPTION CHARACTERISTICS
 ◇
 ◇CONCLUSION

Fig. 9F 93
94
◆FACSIMILE BROADCAST RECEIVER
 ◇PREFACE
 ◇EXPERIMENTAL SPECIFICATION OF DIGITAL FACSIMILE BROADCAST
 ◆PROTOTYPE FACSIMILE BROADCAST RECEIVER USED FOR
   EVALUATION OF RECEPTION CHARACTERISTICS
  ◇
 ◇CONCLUSION

Fig. 9G

```
◆FACSIMILE BROADCAST RECEIVER
 ◇PREFACE
 ◇EXPERIMENTAL SPECIFICATION OF DIGITAL FACSIMILE BROADCAST
 ◆PROTOTYPE FACSIMILE BROADCAST RECEIVER USED FOR
   EVALUATION OF RECEPTION CHARACTERISTICS
   ◇OUTLINE OF PROTOTYPE RECEIVER
   ◇RECEPTION CHARACTERISTICS
 ◇CONCLUSION
```
—5

Fig. 9H

```
◆FACSIMILE BROADCAST RECEIVER
 ◇PREFACE
 ◇EXPERIMENTAL SPECIFICATION OF DIGITAL FACSIMILE BROADCAST
 ◆PROTOTYPE FACSIMILE BROADCAST RECEIVER USED FOR
   EVALUATION OF RECEPTION CHARACTERISTICS
   ◇OUTLINE OF PROTOTYPE RECEIVER
   ◆RECEPTION CHARACTERISTICS
     ◇RECEPTION CHARACTERISTICS UNDER LOW INPUT VOLTAGE
     ◇RECEPTION CHARACTERISTICS UNDER GHOST INTERFERENCE
 ◇CONCLUSION
```
—5

Fig. 9I

```
◆FACSIMILE BROADCAST RECEIVER
 ◆PREFACE
   ◇FACSIMILE BROADCAST USES BROADCAST WAVE TO TRANSMIT
     CHARACTERS, GRAPHICS, PHOTOGRAPHS ...
 ◆EXPERIMENTAL SPECIFICATION OF DIGITAL FACSIMILE BROADCAST
   ◇MULTIPLEX SYSTEM OF DIGITAL FACSIMILE BROADCAST ...
 ◆PROTOTYPE FACSIMILE BROADCAST RECEIVER USED FOR EVALUATION
   OF RECEPTION CHARACTERISTICS
   ◆OUTLINE OF PROTOTYPE RECEIVER
     ◇A GENERAL BLOCK DIAGRAM OF THE PROTOTYPE DIGITAL
       FACSIMILE BROADCAST RECEIVER ...
   ◆RECEPTION CHARACTERISTICS
     ◆RECEPTION CHARACTERISTICS UNDER LOW INPUT VOLTAGE
```
—5

Fig. 9J

```
◆FACSIMILE BROADCAST RECEIVER
 ◆PREFACE
  ◇FACSIMILE BROADCAST USES BROADCAST WAVE TO TRANSMIT
   CHARACTERS, GRAPHICS, PHOTOGRAPHS ...
 ◆EXPERIMENTAL SPECIFICATION OF DIGITAL FACSIMILE BROADCAST
  ◇EXPERIMENTAL SPECIFICATION OF DIGITAL FACSIMILE BROADCAST
   MULTIPLEX SYSTEM OF DIGITAL FACSIMILE BROADCAST ...
  ◇PROTOTYPE FACSIMILE BROADCAST RECEIVER USED FOR
   EVALUATION OF RECEPTION CHARACTERISTICS
  ◇OUTLINE OF PROTOTYPE RECEIVER
   ◆A GENERAL BLOCK DIAGRAM OF THE PROTOTYPE DIGITAL
    FACSIMILE BROADCAST RECEIVER ...
  ◇RECEPTION CHARACTERISTICS
  ◇RECEPTION CHARACTERISTICS UNDER LOW INPUT VOLTAGE
```
—5

Fig. 9K

```
◆FACSIMILE BROADCAST RECEIVER
 ◆PREFACE
 ◆EXPERIMENTAL SPECIFICATION OF DIGITAL FACSIMILE BROADCAST
 ◆PROTOTYPE FACSIMILE BROADCAST RECEIVER USED FOR EVALUATION
  OF RECEPTION CHARACTERISTICS
 ◆CONCLUSION
```
—5

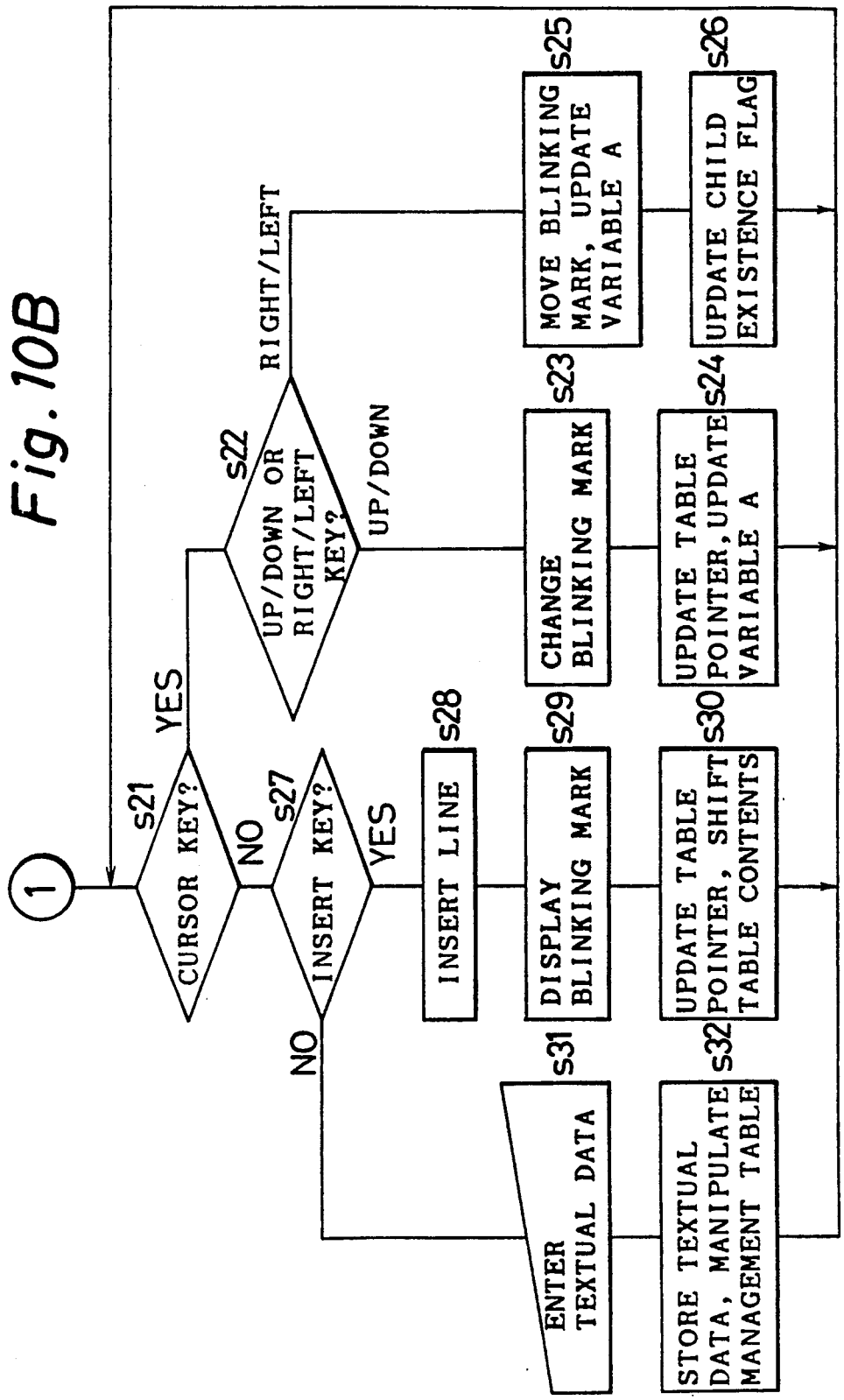

Fig. 23D

```
book
- Alternative : 18 -
1   book
2   buck
3   bake
4   beak
```

Fig. 23E

```
book
- Definition : 3 - -
  1.  Noun
A printed and bound
work.
```

Fig. 23F

```
book
- - -Synonym : 2 - - -
  1.  Noun
1   volume
2   tome
```

Fig. 27A

```
HAMILTON OLIVIA
951-654-3654
FAX 654-3755
101 4th AVE. NEW YORK, N.Y. 07250
ABC CONSULTING
BIRTHDAY JUNE 19
```
—5

Fig. 27B

```
[HAMILTON] OLIVIA
951-654-3654
FAX 654-3755
101 4th AVE. NEW YORK, N.Y. 07250
ABC CONSULTING
BIRTHDAY JUNE 19
(△)(▽)(◁)(▷)  THEN (ENTER)   QUIT=(C·CE)
```
—5

Fig. 27C

```
HAMILTON OLIVIA
951-654-3654
FAX 654-3755
101 4th AVE. NEW YORK, N.Y. 07250
ABC CONSULTING
BIRTHDAY JUNE 19
(△)(▽)(◁)(▷)  THEN (ENTER)   QUIT=(C·CE)
```
—5

Fig. 27D

```
HAMILTON OLIVIA
951-654-3654
FAX 654-3755
101 4th AVE. NEW YORK, N.Y. 07250
ABC CONSULTING
BIRTHDAY JUNE 19

(△)(▽)(◁)(▷)   THEN (ENTER)   QUIT=(C·CE)
```

Fig. 27E

```
HAMILTON OLIVIA              1  SCHEDULE
951-654-3654                 2  TEL
FAX 654-3755                 3  BUSINESS
101 4th AVE. NEW YORK, N.Y.  4  MEMO
ABC CONSULTING               5  OUTLINE
BIRTHDAY JUNE 19             6  IC-CARD
                             7  ALL
```

Fig. 27F

```
SEARCHING
TO QUIT PUSH [ON] KEY
```

Fig. 27G

```
THU DEC 5, 1991                        [339/ 26] 49
  5 • 7 • 9 •11• 1 • 3 • 5 • 7 • 9 •11•
 ◁──▒▒▒──▒▒▒──────▒▒▒─────────────────▷
 8:00AM ~11:00AM
 GO OVER CATALOG OF ELECTRONIC ORGANIZER
 AT [ABC CONSULTING]

(△)(▽)(◁)(▷)  THEN (ENTER)  QUIT=(C•CE)
```
─ 5

Fig. 27H

▒▒▒▒▒▒▒▒ NOT FOUND ! ▒▒▒▒▒▒▒▒ ─ 5

Fig. 27I

```
THU DEC 5, 1991                        [339/ 26] 49
  5 • 7 • 9 •11• 1 • 3 • 5 • 7 • 9 •11•
 ◁──▒▒▒──▒▒▒──────▒▒▒─────────────────▷
 8:00AM ~11:00AM
 GO OVER CATALOG OF ELECTRONIC ORGANIZER
 AT [ABC CONSULTING]

(△)(▽)(◁)(▷)  THEN (ENTER)  QUIT=(C•CE)
```
─ 5

Fig. 27J

```
THU DEC 5, 1991                   [339/ 26] 49
 5 · 7 · 9 ·11· 1 · 3 · 5 · 7 · 9 ·11·
◁━━━━▨▨▨━▨▨▨━━━▨▨▨━━━━━▷
 8:00AM ~11:00AM
GO OVER [CATALOG] OF ELECTRONIC ORGANIZER
AT ABC CONSULTING (△)(▽)(◁)(▷)   THEN (ENTER)  QUIT=(C·CE)
```
— 5

Fig. 27K

```
THU DEC 5, 1991
 5 · 7 · 9 ·11· 1 · 3 · 5 ·  ┌─────────────┐
◁━━━━▨▨▨━▨▨▨━━━▨▨▨━        │1│ SCHEDULE  │
 8:00AM ~11:00AM              │2│ TEL       │
GO OVER [CATALOG] OF ELECTRONIC│3│ BUSINESS  │
AT ABC CONSULTING             │4│ MEMO      │
                              │5│ OUTLINE   │
                              │6│ IC-CARD   │
                              │7│ ALL       │
                              └─────────────┘
```
— 5

Fig. 27L

```
▨▨▨▨▨▨▨ SEARCHING ▨▨▨▨▨▨▨
▨▨ TO QUIT PUSH [ON] KEY ▨▨
```
— 5

Fig. 27M

```
◆Analysis of Electronic Organizer
 ◆Introduction
  ◇About WIZARD [catalog] spec
 ◆Using WIZARD
  ◇Summary of functions
  ◇Other Features
  ◇Limitations
 [(△)(▽)(◁)(▷)]  THEN (ENTER)  QUIT=(C·CE)
```
—5

Fig. 27N

```
◆Analysis of Electronic Organizer
 ◆Introduction
  ◇About WIZARD catalog spec
 ◆Using WIZARD
  ◇Summary of functions
  ◇Other Features
  ◇Limitations
  ◇Problems
```
—5

Fig. 30D

```
COMPANY : SHARP CORPORATION
0NEW DEPARTMENT
1PRODUCT PLANNING DEP.  PERSONAL EUQI...
 TEL 000-111-2222    FAX 000-111-9999
 599 BROADWAY NEW YORK, NY 10012
2ENGINEERING DEPT. 1 PERSONAL EQUIPME...
 TEL 000-111-333     FAX 000-111-8888
 599 BROADWAY NEW YORK, NY 10012
```
~5

Fig. 30E

```
COMPANY : SHARP CORPORATION
DEPARTMENT : PRODUCT PLANNING DEP.
PERSONAL EQUIPMENT DIV.
MAIN TEL NUMBER : 000-111-2222
FAX NUMBER : 000-111-9999
DEPT. ADDRESS : 711 BROADWAY, 133 STREET
03156
NAME?
```
~5

Fig. 30F

```
DEPARTMENT : PRODUCT PLANNING DEP.
PERSONAL EQUIPMENT DIV.
MAIN TEL NUMBER : 000-111-2222
FAX NUMBER : 000-111-9999
DEPT. ADDRESS : 711 BROADWAY, 133 STREET
03156
NAME : SMITH JOHN
POSITION?
```
~5

Fig. 30G

```
PERSONAL EQUIPMENT DIV.
MAIN TEL NUMBER : 000-111-2222
FAX NUMBER : 000-111-9999
DEPT. ADDRESS : 711 BROADWAY, 133 STREET
03156
NAME : SMITH JOHN
POSITION : GENERAL MANAGER
EXTENSION/DIRECT?
```
—5

Fig. 30H

```
PERSONAL EQUIPMENT DIV.
MAIN TEL NUMBER : 000-111-2222
FAX NUMBER : 000-111-9999
DEPT. ADDRESS : 711 BROADWAY, 133 STREET
03156
NAME : SMITH JOHN
POSITION : GENERAL MANAGER
EXTENSION/DIRECT : 000-111-5555_
```
—5

Fig. 30I

```
PERSONAL EQUIPMENT DIV.
MAIN TEL NUMBER : 000-111-2222
FAX NUMBER : 000-111-9999
DEPT. ADDRESS : 711 BROADWAY, 133 STREET
03156
NAME : SMITH JOHN
POSITION : GENERAL MANAGER
              STORED
```
—5

Fig.30J

```
SHARP CORPORATION
SMITH JOHN
GENERAL MANAGER
PRODUCT PLANNING DEP.
PERSONAL EQUIPMENT DIV.
TEL 000-111-2222    FAX 000-111-9999
EXT/DIRECT 000-111-5555
711 BROADWAY, 133 STREET 03156
```
—5

ELECTRONIC APPARATUS

BACKGROUND OF THE INVENTION

The present invention relates to improvements in small electronic apparatus having a text processing means and a storage means for storing input textual data.

The invention also relates to a small electronic apparatus such as a so-called electronic organizer or the like, and more particularly to a small electronic apparatus having a plurality of modes each controlling specific data.

Furthermore, the invention relates to a small electronic apparatus capable of storing various kinds of input data.

DESCRIPTION OF THE PRIOR ART

Some of small electronic apparatus currently in wide use are capable of inputting text from the attached keyboard and storing the thus input text. A variety of documents ranging from materials for a conference to materials for presiding at a wedding reception, etc. are written using such small electronic apparatus. Most of such documents naturally are organized in a hierarchical structure. The hierarchical structure of a document consists specifically of a title, a plurality of subjects or items under the title, and a detailed description under each subject or item. It is often possible to subdivide the description under one subject or item into a plurality of portions according to the content.

With conventional small electronic apparatus, the hierarchical structure of text as mentioned above can be shown on the display thereof by the user's efforts such as providing indentations, item numbers, etc. However, since the text is expressed by one-dimensional strings of character codes within the electronic apparatus, it has not been possible to process the text in accordance with the hierarchical structure the way that the user intended. For example, in order to delete a part relating to a certain subject from the input text, it has been necessary to specify the part to be deleted while checking the subject and the description relating to the subject on the display. Since the display provided on a small electronic apparatus is usually very small, such deletion work has been cumbersome particularly when the part to be deleted is long.

Also, electronic apparatus such as electronic organizers usually provide a plurality of modes in which to achieve a telephone book function, a schedule organizing function, a memo function, etc. Each of these modes is often provided with a data search function to facilitate retrieval of destination data from a large amount of data placed under the control of the mode. For example, to retrieve data from a telephone book stored in an electronic organizer, the following operation is performed. First, the telephone book mode is selected, and then, a prescribed key operation is performed to specify the execution of data search. After that, a key character string used in data search (hereinafter called the "search character string") is entered from the keyboard, thereby actually performing data search. As a result, data containing the character string thus entered is retrieved from the data contained in the telephone book and is displayed on the display.

Data retrieval can thus be performed on the telephone book data in the telephone book mode, for example. However, after the data retrieval, if data containing the same search character string is to be retrieved from the schedule data, for example, it has been necessary to move from the telephone book mode to the schedule mode and reenter the search character string from the keyboard. Therefore, with prior art electronic apparatus, data retrieval has had to be performed independently in each mode. In other words, it has not been possible to use the search character string entered in the current mode for retrieval of data that is under the control of a different mode; data retrieval in that different mode has only been possible by reentering the search character string after moving to that mode.

Furthermore, small electronic apparatus such as the so-called electronic organizers are designed to be capable of performing various functions. For example, with a business card file function, data items such as the company name, the department name, the telephone number, the person's name, etc. can be entered from the keyboard and can be stored in the electronic organizer. The stored data can be retrieved for display on the display.

In such small electronic apparatus, the keys provided on the keyboard are small and the number of keys provided thereon is limited because of dimensional restrictions. As a result, small electronic apparatus have the disadvantage that the operability for data input is more or less impaired as compared with relatively large electronic apparatus such as personal computers. Despite such an unavoidable disadvantage, large volumes of data has to be entered to make effective use of the various functions of small electronic apparatus. When entering data, it often happens that the same data is entered more than once. For example, in the business card file function, there occurs a case in which the same company name has to be entered repeatedly. As described, since the same data has to be entered repeatedly using the not-easy-to-use keyboard, the prior art electronic apparatus have the problem of cumbersome key operations, which also gives rise to the possibility of entering wrong data.

It is possible to overcome this problem to a certain degree by using the so-called "clip board" provided in a certain type of electronic organizer. However, to use the clip board, data must be previously put in the clip board (that is, data must be previously stored in the memory area assigned to the clip board); otherwise, the data cannot be used for later data input.

SUMMARY OF THE INVENTION

In view of the above problems, it is an object of the invention to provide a small electronic apparatus capable of handling text according to its hierarchical structure.

Another object of the invention is to provide a small electronic apparatus capable of performing a flexible data search between different modes without repeatedly entering a search character string.

A further object of the invention is to provide a small electronic apparatus free from cumbersome key operations and having less possibility of erroneous data input even when entering the same data repeatedly.

To accomplish the above objects, the invention provides a small electronic apparatus having text creating means and storage means for storing textual data entered using the text creating means, the text creating means comprising: means for selecting one of hierarchical levels in accordance with the operation by the operator; and means for managing the textual data entered and stored in the storage means by relating it to the selected hierarchical level.

To accomplish the above objects, the invention also provides a small electronic apparatus having text creating means having more than one text processing function and storage means for storing textual data entered using the text creating means, the text creating means comprising: means for selecting one of hierarchical levels in accordance with the operation by the operator; means for managing the textual data entered and stored in the storage means by relating it to the selected hierarchical level; means for selecting one of the stored textual data in accordance with the operation by the operator; and means for performing any one of the text processing functions by handling as one block the textual data selected by the textual data selecting means and the textual data related to a lower hierarchical level directly or indirectly subordinate to the hierarchical level of the selected textual data on the basis of the management information held in the managing means.

To accomplish the above objects, the invention provides a still another small electronic apparatus having text creating means, storage means for storing textual data entered using the text creating means, and data processing means other than the text creating means, the text creating means comprising: means for selecting one of hierarchical levels in accordance with the operation by the operator; means for managing the textual data entered and stored in the storage means by relating it to the selected hierarchical level; means for selecting one of the stored textual data in accordance with the operation by the operator; and means for storing the textual data selected by the textual data selecting means, together with the textual data related to a lower hierarchical level directly or indirectly subordinate to the hierarchical level of the selected textual data, into storage means accessible by that other data processing means on the basis of the management information held in the managing means.

To accomplish the above objects, the invention further provides a small electronic apparatus having text creating means, storage means for storing textual data entered using the text creating means, and display means for displaying the textual data stored in the storage means, the text creating means comprising: means for selecting one of hierarchical levels in accordance with the operation by the operator; means for managing the entered textual data by relating it to the selected hierarchical level; means for selecting one of the stored textual data in accordance with the operation by the operator; and means for displaying the selected textual data, together with the textual data belonging to a hierarchical level coordinate with the hierarchical level of the selected textual data and subordinate to a higher hierarchical level to which the hierarchical level of the selected textual data is subordinate, on the display means on the basis of the management information held in the managing means.

According to the invention, there is provided a small electronic apparatus capable of creating text having a hierarchical structure and of manipulating the created text in accordance with the hierarchical structure thereof. Also, in the small electronic apparatus of the invention, just by specifying certain textual data in a piece of text as a candidate for text processing, the textual data directly or indirectly subordinate to the specified textual data is automatically included as a candidate for processing; thus, the candidate for processing can be selected effectively and correctly when processing text having a hierarchical structure. Furthermore, in the small electronic apparatus of the invention, it is possible to display only the textual data related to a certain hierarchical level, omitting from the display the textual data related to lower hierarchical levels than that level. This helps to grasp the whole text structure even when the size of the display device provided in the electronic apparatus is limited. To sum up, with the small electronic apparatus of the invention, it is possible to create text intrinsically having a hierarchical structure.

To accomplish the above objects, the invention provides a small electronic apparatus having a plurality of modes each controlling specific data, comprising: means for designating a desired character string from among the data under control of one of the plurality of modes; means for storing the designated character string; and means for retrieving data containing the stored character string from among the data under control of another mode.

According to the invention, there is provided an easy-to-use small electronic apparatus capable of performing a flexible data search between a plurality of different modes without repeatedly entering a search character string.

To accomplish the above objects, the invention also provides a small electronic apparatus having data input means, storage means for storing input data, and display means for displaying the data stored in the storage means, comprising: means for displaying on the display means a group of data having a prescribed relationship to data to be input from the data input means; means for selecting data from the group of data displayed; and means for determining the selected data as the data to be input.

According to the invention, there is provided a small electronic apparatus in which data can be entered effectively by a simple key operation using already entered data when the data to be entered is identical to the already entered data. With the small electronic apparatus of the invention, since already entered data can be used, the possibility of erroneous data input is reduced.

BRIEF DESCRIPTION OF THE DRAWINGS

Other and further objects, features, and advantages of the invention will be more explicit from the following detailed description taken with reference to the drawings wherein:

FIG. 7 is a flowchart showing the operation of the embodiment when power is turned on;

FIGS. 9A to 9K are diagrams showing displays at various stages in one example of text creation and text manipulation performed by the text creation program;

FIGS. 10A, 10B, 11 and 12 are flowcharts showing the operation of the text creation program;

FIGS. 23A to 23F are diagrams showing displays during the execution of an application program contained in the memory card of FIG. 3;

FIGS. 27A to 27N are diagrams showing examples of displays during data search processing according to the embodiment;

FIGS. 30A to 30J are diagrams illustrating displays during the execution of the business card file program.

DETAILED DESCRIPTION OF THE PREFERRED EMBODIMENTS

Figure 1:
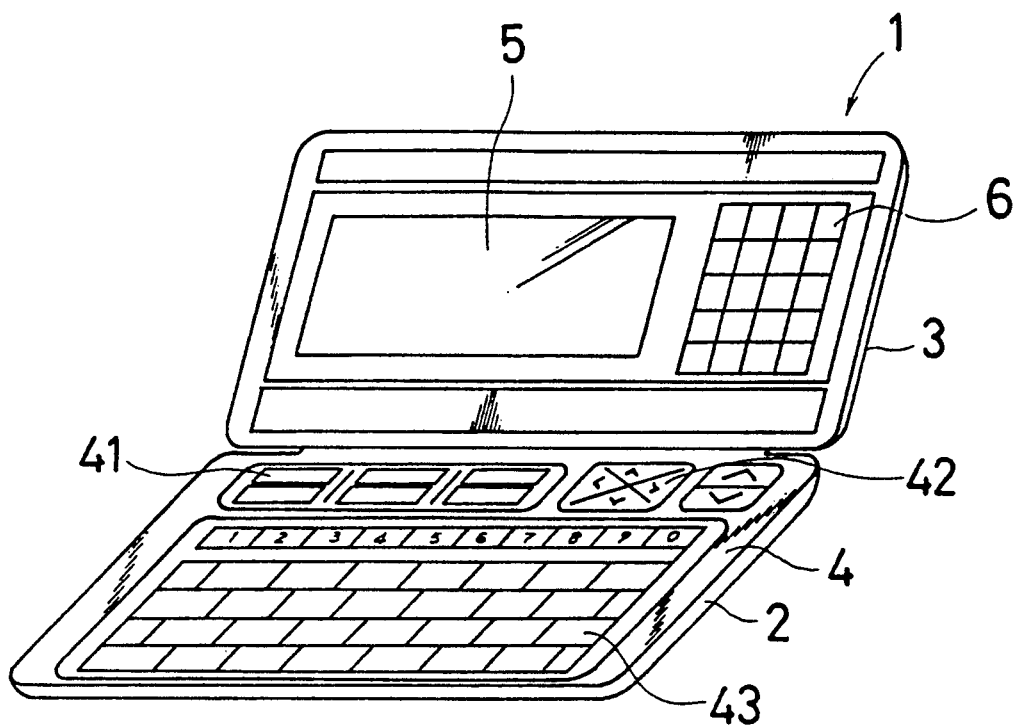
FIG. 1 is a perspective view of one embodiment of the invention.

Now referring to the drawing, preferred embodiments of the invention are described below.

First, we will describe one embodiment of the invention.

FIG. 1 shows an external view of a small electronic apparatus in one embodiment of the invention. The small electronic apparatus 1 of FIG. 1 consists of a main body 2 and a main body cover 3, the main body 2 having a keyboard 4. The keyboard 4 comprises a mode selector section 41, which includes keys for selecting modes, an operation instruction section 42, which includes a power key, function keys for performing various operations (including an "insert" key, a "select" key, and a "call" key), and cursor keys, and a data input section 43, which includes character keys for entering character data and numeric keys for entering numeric data.

Provided on the front of the main body cover 3 are a liquid crystal display (LCD) 5 capable of displaying a plurality of lines and a transparent keyboard 6. Other types of display device having a low power dissipation may be used instead of the LCD 5. A memory card hereinafter described is inserted into position through a slot (not shown) near the hinge on the back of the main body cover 3 in such a manner that the front face of the memory card can be seen through the transparent keyboard 6. The transparent keyboard 6 is used when executing an application program supplied by the memory card.

Figure 2:
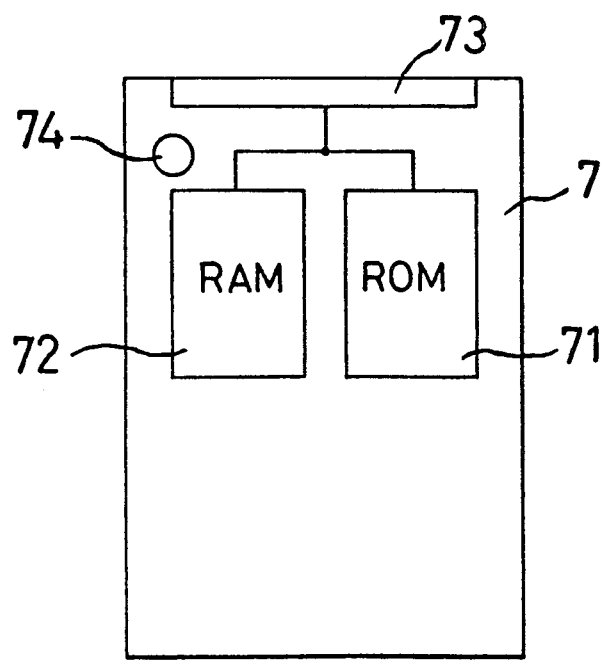
FIG. 2 is a diagram schematically showing the internal configuration of a memory card used in the embodiment.

The internal configuration of the memory card is schematically shown in FIG. 2. As shown, the memory card 7 comprises a ROM 71 for storing an application program, a RAM 72 for storing variable information generated during the execution of the application program, a female connector 73 for connecting the ROM 71 and the RAM 72 to the small electronic apparatus 1, and a backup battery 74 for retaining information stored in the RAM 72. When the application program stored in the ROM 71 is the type that does not generate variable information during the execution thereof, there is no need to provide the RAM 72 or the battery 74.

Figure 3:
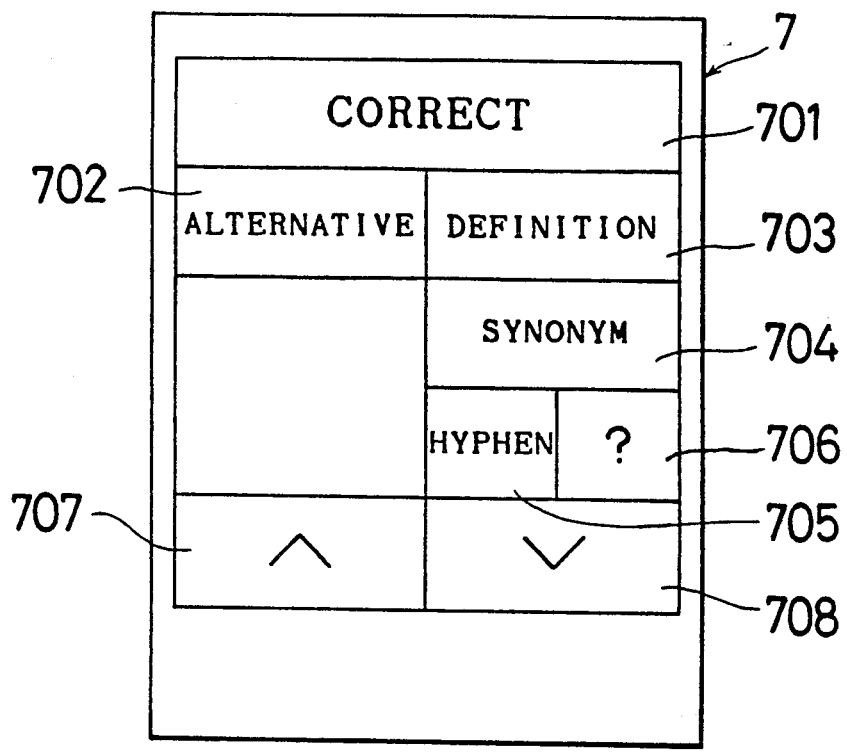
FIG. 3 is a plan view of the memory card.

As shown in FIG. 3, key symbols unique to the application program in the memory card 7 are printed on the front face of the memory card 7. The key symbols do not have the functions as keys, and actual key entries are made using the transparent keyboard 6.

Figure 4:
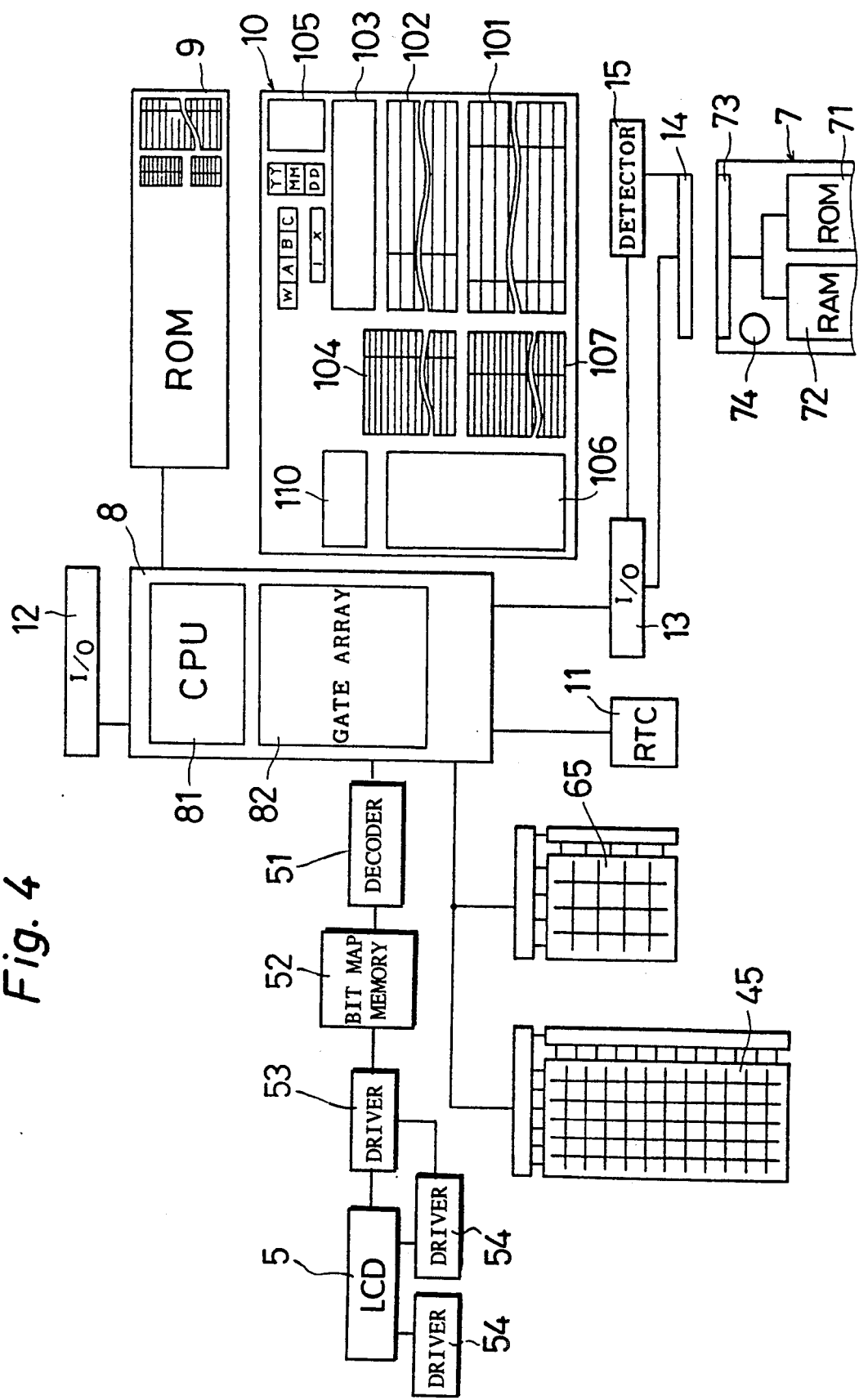
FIG. 4 is a block diagram showing the hardware configuration of the embodiment.

FIG. 4 shows the hardware configuration of the small electronic apparatus 1. A control section 8 for controlling the small electronic apparatus 1 contains a CPU 81 and a gate array 82.

The LCD 5 shown in FIG. 1 is connected to the control section 8 via a decoder 51, a bit map memory 52, a common driver 53, and a segment driver 54. The data to be displayed on the LCD 5 is supplied from the control section 8 to the decoder 51. The decoder 51 decodes the data and writes it into the bit map memory 52. The bit map memory 52 is a memory in which one bit is assigned to every dot of the LCD 5, the bits corresponding to the dots to illuminate being set to "1" and the other bits being set to "0". The common driver 53 and the segment driver 54 are used to display characters, graphics, etc. on the LCD 5 according to the contents stored in the bit map memory 52.

The reference numeral 45 shows a key matrix for detecting key entries from the keyboard 4, while the reference numeral 65 indicates a key matrix for detecting key entries from the transparent keyboard 6.

Also connected to the control section 8 are a ROM 9 and a RAM 10. The ROM 9 stores a basic program for performing basic functions including handling of data input from the keyboard 4 and the transparent keyboard 6 and displaying on the LCD 5; application programs for performing a calendar display function, an address book function, a text creation function, a schedule management function, and a memo function; and a plurality of tables having fixed contents and used in application programs for calendar display, etc. The RAM 10 is used to store variable information needed by the application programs stored in the ROM 9. The RAM 10 has an address book memory area 101, a schedule memory area 102, a memo data memory area 103, a table 104 for managing the information relating to the memo data stored in the memo data memory area 103, a mode memory area 105 for storing the various modes, a textual data memory area 106, a management table 107 for managing hierarchical relationships, etc. of the textual data stored in the text memory area 106, and a data exchange memory area 110 for exchanging data between the application programs. The RAM 10 also has areas for storing various variables, pointers, and flags.

Furthermore, a real time clock (RTC) 11, an expansion terminal (I/O) 12 for connecting an external device such as a printer, and an expansion terminal (I/O) 13 dedicated for a memory card are connected to the control section 8. Connected to the expansion terminal (I/O) 13 are a male connector 14 to which the female connector 73 of the memory card 7 is connected and a detector 15 for detecting the connection of the male connector 14 to the female connector 73 of the memory card 7.

Figure 5:
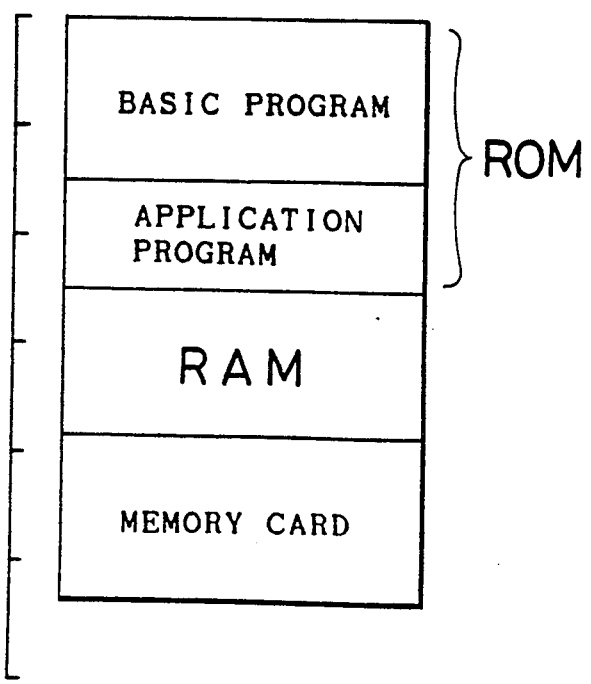
FIG. 5 is a diagram showing the memory map of the embodiment.

FIG. 5 shows the memory map of the small electronic apparatus 1. As shown, the addresses of the small electronic apparatus 1 are assigned to the internal ROM 9 of the electronic apparatus 1, the internal RAM 10 of the electronic apparatus 1, and the internal memory device of the memory card 7, in this order. Since the ROM 9 and the RAM 10 have fixed capacities, the addresses assigned to them are fixed. On the other hand, addresses starting at the address next to the last address of the internal RAM 10 of the electronic apparatus 1 are assigned to the internal memory device of the memory card 7 (the internal memory device consists of the ROM 71 and the RAM 72 or only of the ROM 71). The capacity of the internal memory device of the memory card 7 may vary from card to card. This means that the last address assigned to the internal memory device of the memory card may vary from card to card. However, the high limit of the last address is determined by the specification of the control section 8.

Figure 6:
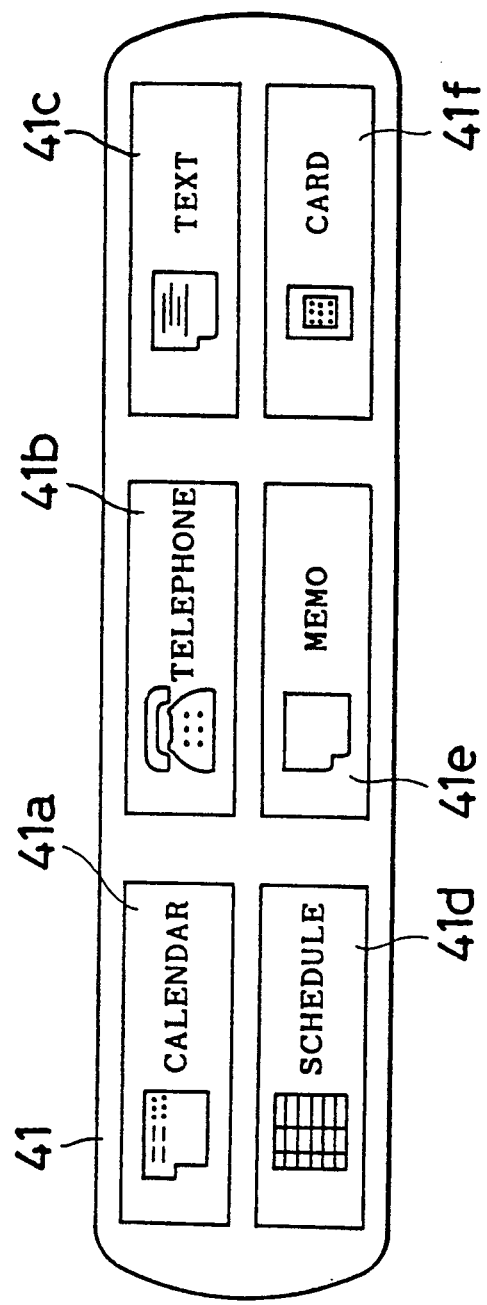
FIG. 6 is a diagram showing the mode selector section of the embodiment.
Figure 7:
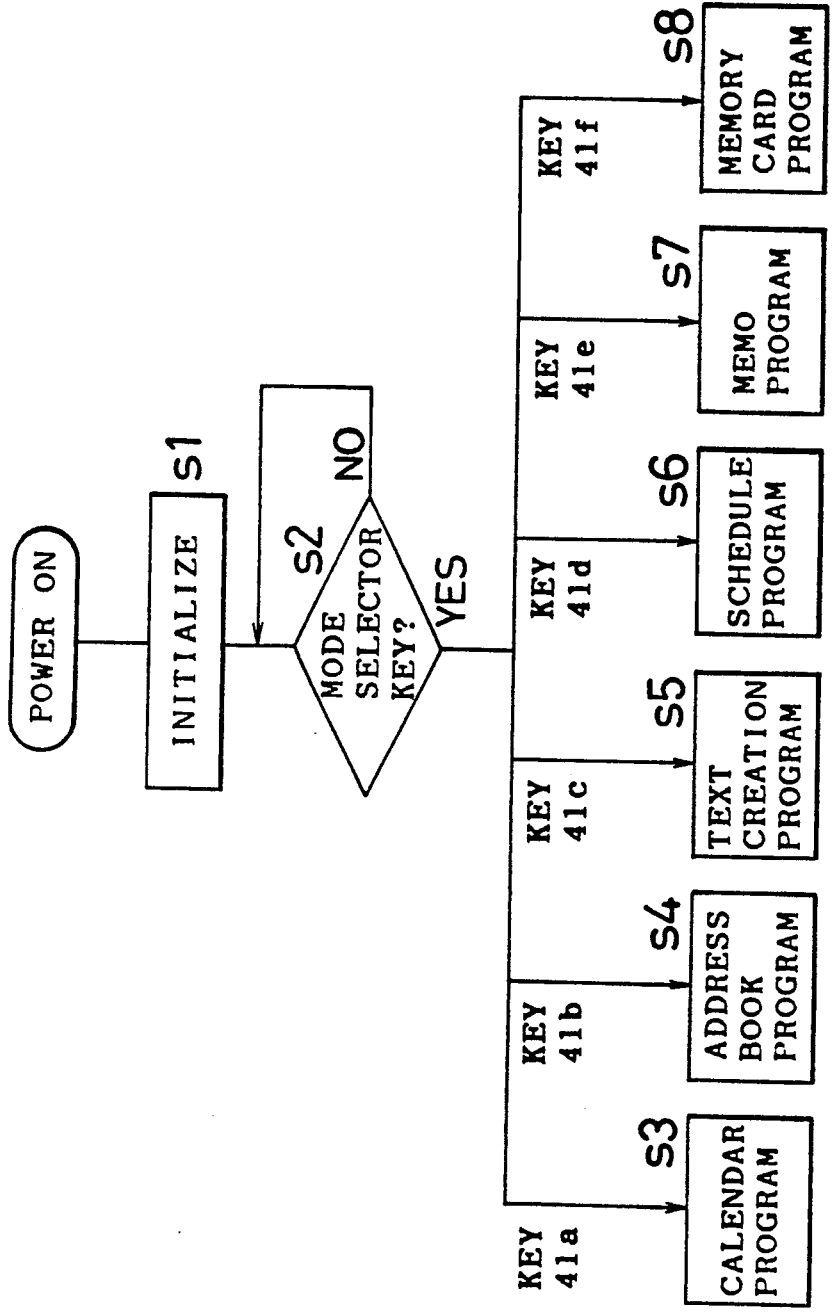

Referring now to FIGS. 6 and 7, we will describe the operation of the small electronic apparatus 1 when power is turned on.

FIG. 6 shows the mode selector section 41 having six mode selector keys 41a to 41f. The mode selector keys 41a to 41e are used to start the application programs stored in the internal ROM 9 of the small electronic apparatus 1, while the mode selector key 41f is used to start the application program of the memory card 7 loaded into the small electronic apparatus 1.

As shown in the flowchart of FIG. 7, when power is turned on, each section of the small electronic apparatus 1 is initialized (step s1), getting ready for the depression of the mode selector keys 41a to 41f (step s2). When any one of the mode selector keys is depressed, the application program corresponding to the depressed mode selector key is started (steps S3–S8). Even when one application program has been started, any other application program can be started by depressing the corresponding mode selector key 41a to 41f.

The mode selector key 41a is depressed to start the calendar program (step s3). The calendar program is primarily for displaying a calendar for the month to which the current date belongs.

The mode selector key 41b is depressed to start the address book program (step s4). The address book program allows the creation of an address book in which the person's name, the telephone number, and the address are stored as a set of data. By entering the name of the person whose telephone number and/or address are needed, the required information can be retrieved from the address book.

The mode selector key 41c is depressed to start the text creation program (step s5). Using the text creation program, it is possible to create and manipulate text having a hierarchical structure, as detailed hereinafter.

The mode selector key 41d is depressed to start the schedule program (step s6). Using the schedule program, it is possible to create a table of schedule data each consisting of date and schedule item and retrieve future schedule data nearest to the current date from the schedule table.

The mode selector key 41e is depressed to start the memo program (step s7). Using the memo program, it is possible to input memo data and display the input memo data.

When the mode selector key 41f is depressed, the detector 15 is activated which electrically detects the connection of the female connector 73 of the memory card 7 to the male connector 14 of the small electronic apparatus 1, to check whether the memory card 7 is loaded or not. When it is decided that the memory card 7 is not loaded, the depression of the mode selector key 41f is disabled. On the other hand, when it is decided that the memory card 7 is loaded, the application program contained in the internal ROM 71 of the memory card 7 is started.

The application programs will now be described.

Figure 8:
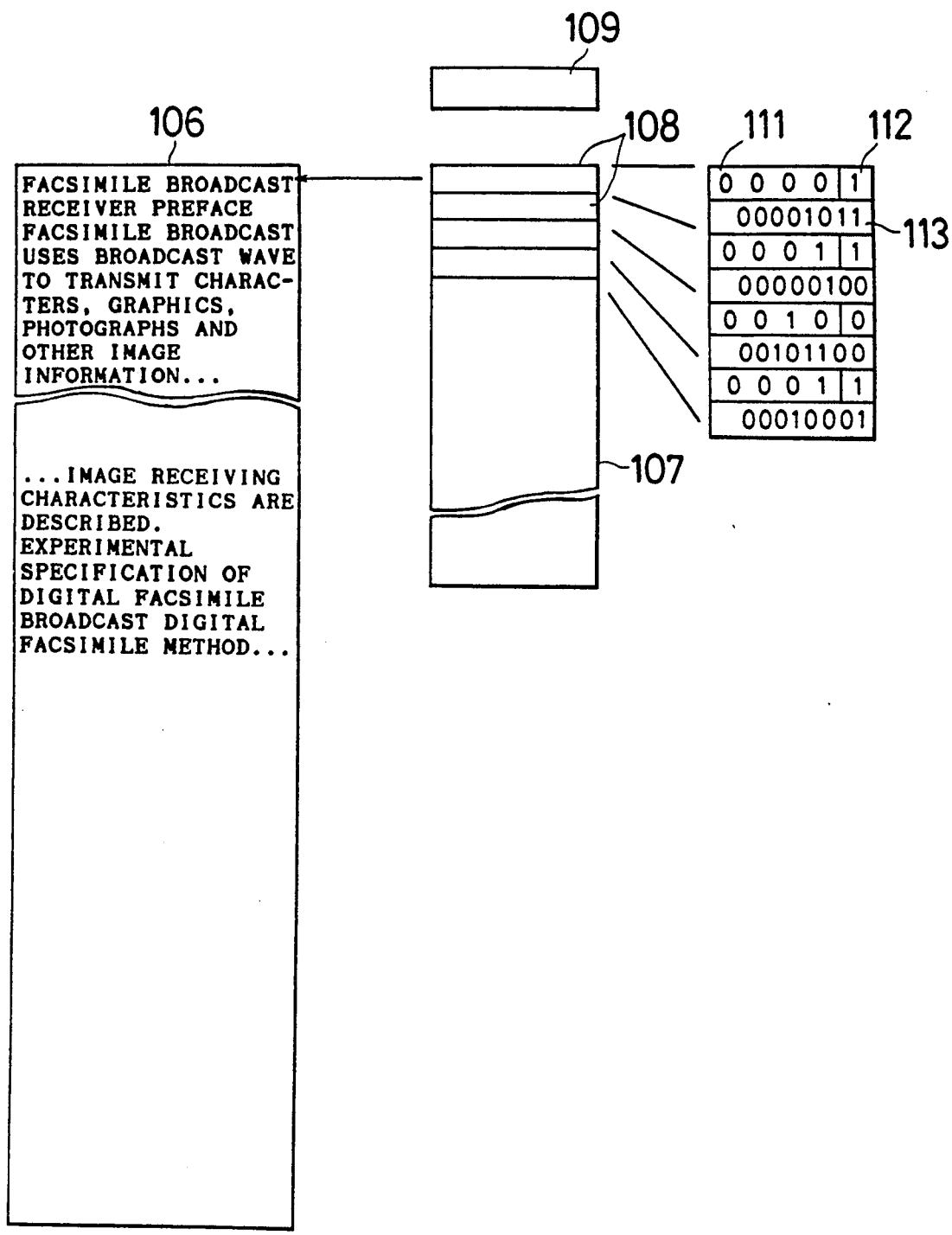
FIG. 8 is a diagram explaining how textual data is managed by a text creation program.

First, we will describe the text creation program. FIG. 8 shows how textual data is managed by the text creation program. Textual data entered is stored in the textual data memory area 106 in the RAM 10 in the same order that it is arranged in the entire text. Individual pieces of textual data stored in the textual data memory area 106 are separated from each other by a delimiter not shown.

In this embodiment, each textual data is assigned a hierarchical level, under direct subordination to which more than one textual data belonging to a hierarchy one level lower than that of the above textual data can be placed. Thus, as a whole, the textual data stored in the textual data memory area 106 is organized in a tree-structured hierarchical relationship.

The hierarchical relationship of the textual data stored in the textual data memory area 106 is managed using the management table 107. The management table 107 has a plurality of fixed-length entries 108. In FIG. 8, the arrow marks extending from the entries 108 to the textual data memory 106 area indicate the correspondence of the entries 108 of the management table 107 relative to the textual data. As is apparent from FIG. 8, the entries 108 of the management table 107 are arranged in the management table 107 in accordance with the order in which the textual data is stored in the textual data memory area 106.

Each entry 108 of the management table 107 consists of a hierarchy field 111, a child existence flag 112, and a character number field 113. A binary number representing the hierarchy of the textual data corresponding to the entry 108 is stored in the hierarchy field 111. In this embodiment, a higher level of hierarchy is represented by a smaller value. The highest level of hierarchy represented by the binary number "0000" is dedicated to the title of text. The hierarchical levels represented by the binary numbers "0001", "0010", and "0011" are assigned to the textual data classified as "major item", "medium item", and "minor item", respectively. It is also possible to input textual data belonging to a lower hierarchical level than that of the minor item. The child existence flag 112 is set to "1" when textual data directly subordinate to the textual data corresponding to the entry 108 exists, and to "0" when such textual data does not exist. The number of characters contained in the textual data corresponding to the entry 108 is stored in the character number field 113.

Since the entries 108 of the management table 107 are arranged in the management table 107 in accordance with the order in which the textual data is stored in the textual data memory area 106, as previously mentioned, there is no need to provide a pointer chain between the entries 108 for explicitly pointing to the tree-structure hierarchical relationship.

A table pointer 109 is a pointer that points to the entry 108 of the management table 107, and the entry 108 pointed to by the table pointer 109 is changed as the text creating and editing work by the text creation program progresses, as described hereinafter.

To help understand the operation of the text creation program, we will describe a procedure for creating text and a procedure for manipulating the created text using the text creation program with reference to FIGS. 9A to 9I, before proceeding to the description of the program operation.

Figure 9A:
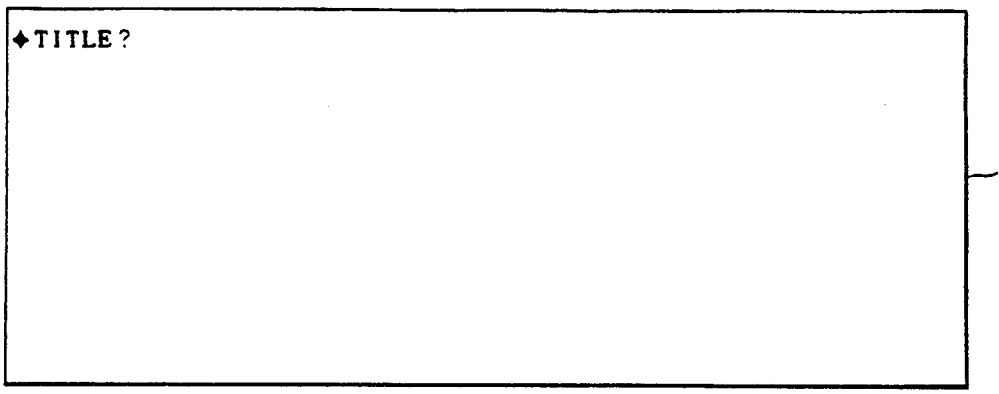
Figure 9B:
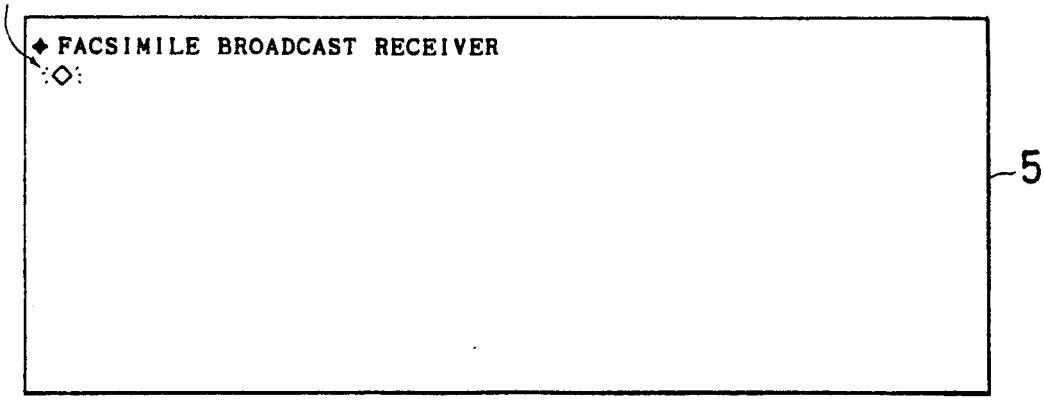

At the start of text creation, a message as shown in FIG. 9A is displayed prompting the operator to enter the title of the text to be created. FIG. 9B shows the display when the character data "Facsimile broadcast receiver" has been entered as the title. As shown, a mark 91 is blinking at the position indented by one character on the line next to the title line, prompting the operator to enter a major item. In this embodiment, the operator is notified of the hierarchical level of the textual data by the position of the mark 91 on the line. Thus, the hierarchical levels of the medium and minor items are indicated by the indentations by two and three characters, respectively.

The entered title (textual data) is stored at the top of the textual data memory area 106, as shown in FIG. 8. Hierarchical information "0000" and character number "00001011" (11 in decimal notation) are written into the entry 108 of the management table 107 corresponding to the title. The child existence flag 112 of the entry 108 is always set at "1" in the case of the title of text.

Figure 9C:
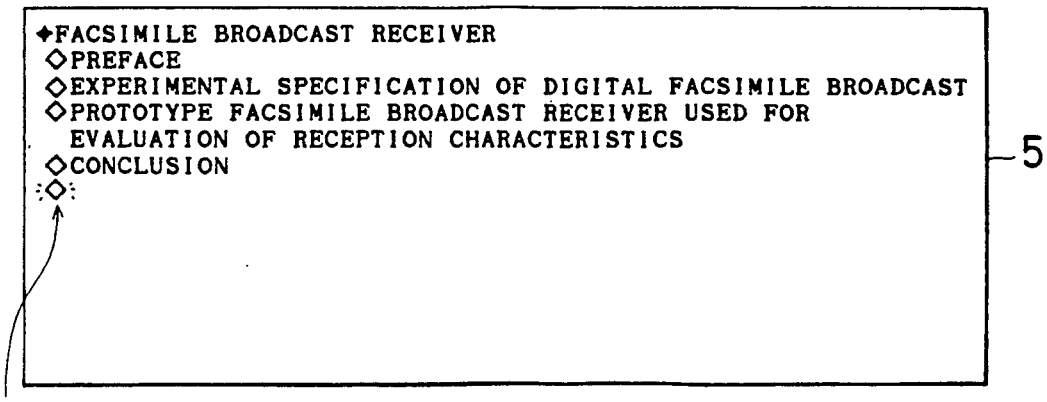

FIG. 9C shows the display after four major items have been entered. The entered major items are stored in the textual data memory area 106, part of which is shown in FIG. 8. The entries 108 corresponding to the major items are created in the management table 107. "0001" is written into the hierarchy field 111 of each of these entries 108. The number of characters of each major item is stored in the character number field 113 of the corresponding entry 108. The child existence flag 112 is set to "0" since there is no textual data (medium item) subordinate to the major items when the major items are entered. The child existence flag 112 is set to "1" when a subordinate medium item is entered.

In this embodiment, when one major item has been entered, a blinking mark 92 is displayed on the next line at the same indented position as that of the mark 91 for that major item, prompting the operator to enter the next major item. As will be described hereinafter, the hierarchical level of the textual data to be entered can be changed by moving the blinking mark using a cursor key.

To enter a medium item after the major items have been entered, first a cursor key is operated to select the major item corresponding to the parent of the medium item to be entered. The selected major item is indicated by a blinking mark 93 as shown in FIG. 9D. When the "insert" key is depressed at this time, a new line is inserted on which only a blinking mark 94 is displayed, as shown in FIG. 9E. The mark 94 is displayed with the same indentation as that of the mark 93 attached to the selected major item. Next, to enter the medium item, the mark 94 is moved one character to the right using a cursor key (FIG. 9F). At this time, the mark 93 attached to the major item one line above the inserted line changes from a white to a blacked-out mark. In this embodiment, a white mark indicates that there is no textual data subordinate to the textual data corresponding to that mark, and a black mark indicates that there is textual data subordinate to the textual data corresponding to that mark. Alternatively, the shape of the mark may be changed to indicate the presence or absence of subordinate textual data.

FIG. 9G shows the display after two medium items "Outline of the prototype receiver" and "Reception characteristics" have been entered. The input of the second medium item "Reception characteristics" is also accomplished by inserting a new line using the "insert" key. The entered medium items are stored in the textual data memory area 106 of FIG. 8. The entries 108 corresponding to the medium items are created in the management table 107, and appropriate data is written into the created entries 108. Also, since the subordinate medium items are entered, "1" is written into the child existence field 112 of the entry 108 corresponding to the major item "Prototype . . . "

A minor item can be entered using a procedure similar to that for entering a medium item (FIG. 9H). FIG. 9I shows the display after all inputs have been made.

Figure 10A:
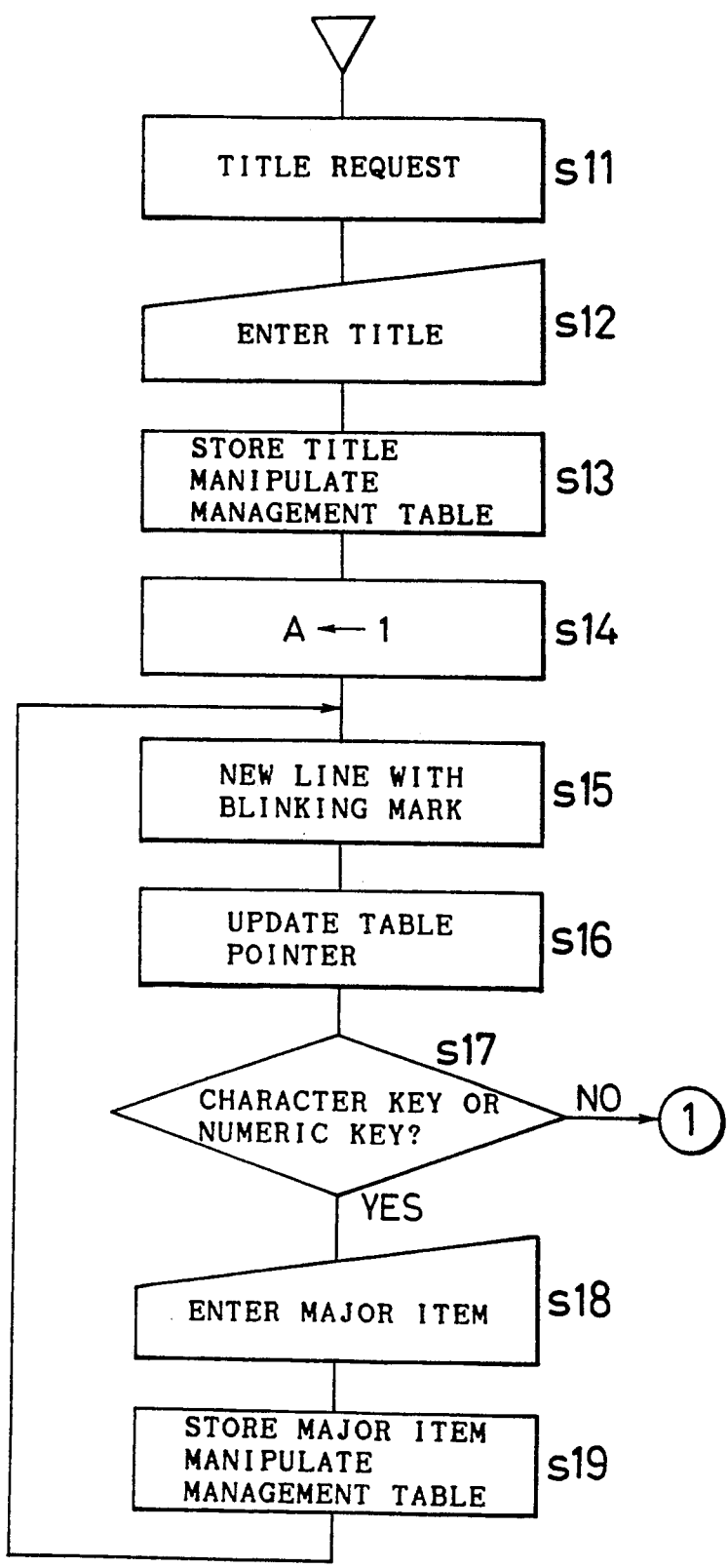

Referring now to FIGS. 10A and 10B, we will describe the operation of the text creation program for creation of text.

First, a message is displayed prompting the operator to enter a title (step s11). At step s12, the title is entered. The entered title is stored in the textual data memory area 106, appropriate data being written into the title entry 108 in the management table 107 (step s13). At step s14, the number "1" representing the major item is substituted for a variable A indicating the hierarchy. Then, a new line is started with a blinking mark displayed (step s15). Also, the table pointer 109 is updated so as to point to the next entry 108 (step s16). At step s17, it is checked whether a character key or a numeric key is operated for entry of textual data; if it is decided that a character key or a numeric key has been operated, the process proceeds to step s18, and if not, the process proceeds to step s21 of FIG. 10B. At step s18, a major item is entered. The entered major item is stored in the textual data memory area 106, appropriate data being written into the entry 108 of the management table 107 pointed to by the table pointer 109 (step s19). When the processing of step s19 is completed, the process returns to step s15.

At step s21 (FIG. 10B), it is checked whether a cursor key is depressed; if it is decided that a cursor key has been depressed, the process proceeds to step s22, and if not, the process proceeds to step s27. At step s22, it is checked whether the depressed cursor key is an up/down key or a right/left key, and the process proceeds to step s23 in the case of an up/down key and to step s25 in the case of a right/left key.

At step s23, the mark to blink is changed according to the kind of the depressed cursor key. At step s24, the table pointer 109 is updated according to the kind of the depressed cursor key, and the variable A is updated according to the contents of the hierarchy field 111 of the entry 108 pointed to by the updated table pointer 109. Thereafter, the process returns to step s21.

On the other hand, at step s25, the blinking mark is moved to the right or left according to the kind of the depressed cursor key, updating the variable A accordingly. Next, at step s26, the child existence flag 112 of the entry 108 is updated which is related to the textual data corresponding to the direct parent of the textual data to be entered after the blinking mark. Such an entry 108 can be easily located by searching the management table upward from the position pointed to by the table pointer 109. Thereafter, the process returns to step s21.

At step s27, it is checked whether the depressed key is the "insert" key or not; if it is determined as the "insert" key, the process proceeds to step s28, and if not, the process proceeds to S31.

At step s28, a new line is inserted. Next, a blinking mark is displayed at the position on the inserted line in accordance with the value of the variable A (step s29). At step 30, the table pointer 109 is updated so as to point to the next entry 108. At order to insert a new entry at that position, the contents of all the entries after the entry 108 pointed to by the updated table pointer 109 are shifted by one entry. Thereafter, the process returns to step s21.

At step s31, textual data is entered. At step s32, the entered textual data is stored in the textual data memory area 106. The location in the textual data memory area of the entered textual data is determined by adding up the values of the character number fields 113 of all entries that come before the entry 108 pointed to by the table pointer 109. Alternatively, a separate pointer may be provided for the textual data memory area 106. Also, at step s32, appropriate data is written into the entry 108 of the management table 107 pointed to by the table pointer 109. At the same time, the value of the variable A is written into the hierarchy field 111 of the entry 108. When the above processing is completed, the process returns to step s21.

According to the text creation program of this embodiment, when certain textual data is selected, the selected textual data and the textual data belonging to the hierarchy directly or indirectly subordinate to the hierarchy of the selected textual data can be processed en bloc for deletion, moving, or copying, as well as for copying to the data exchange memory area 110 used for data exchange with other application programs.

Figure 11:
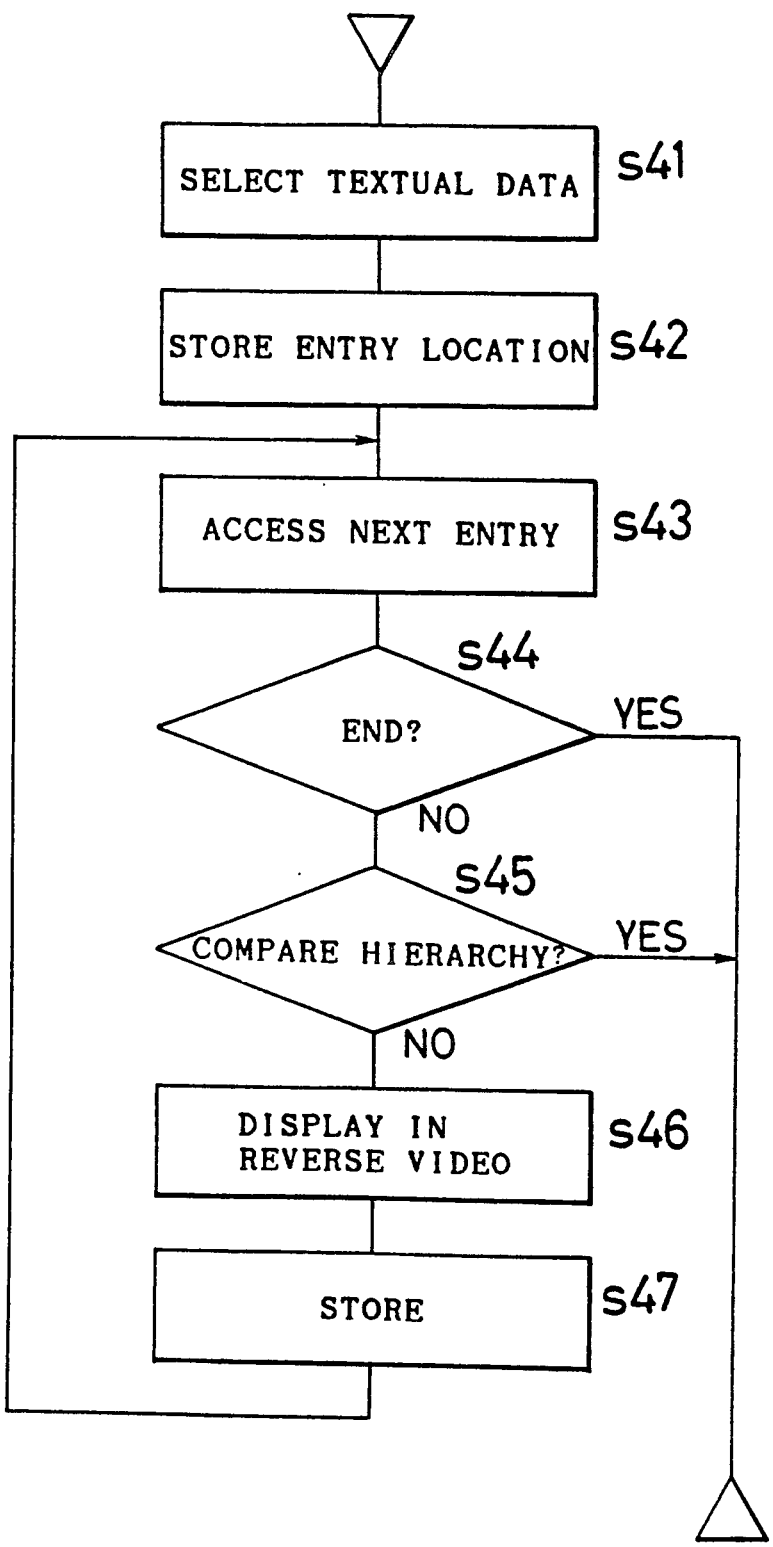

Referring now to FIG. 11, we will describe how the text creation program works to automatically determine the range of text on which the deletion or other text manipulation is performed en bloc. At step s41, the operator selects the textual data belonging to the highest level of hierarchy within the textual data on which to perform text manipulation. The selection is accomplished by moving the cursor to the line of the desired textual data using a cursor key and then depressing the "select" key. At step s42, access is made to the entry 108 of the management table 107 corresponding to the selected textual data, and the location of the entry 108 is stored. At step s43, access is made to the entry 108 next to the last accessed entry 108. At step s44, it is checked whether any data is stored in the accessed entry 108; if data is stored there, the process proceeds to step s45, and if not, it is determined that the end of the textual data is reached, and the processing for determining the range is terminated. At step s45, it is checked whether the value of the hierarchy field 111 of the entry 108 accessed at step s43 is larger than the value of the hierarchy field 111 of the entry 108 whose location was stored at step s42; if the value is larger, the process proceeds to step s46, and if not, the processing is terminated. At step s46, the textual data corresponding to the accessed entry 108 is displayed in reverse video. At step s47, the location of the accessed entry 108 is stored, and the process returns to step s43.

Using a suitable procedure, deletion or other text manipulation is performed on the range of text determined by the entries 108 whose locations have been stored during the processing of FIG. 11. The kind of text manipulation may be specified either before or after determining the range of text for processing.

FIG. 9J shows the display when the major item "Prototype..." has been specified for processing. As shown, the selected major item "Prototype..." and the textual data directly or indirectly subordinate to the major item are displayed in reverse video.

According to the text creation program of this embodiment, the display can be switched between the display of all textual data and the display of the major items only. The processing for switching the display will now be described with reference to FIG. 12. When an operation for a switching the display mode is performed using the keyboard 4 by the operator, first, a flag not shown is referenced to check whether the current display mode is the full text display mode or the major item only display mode (step s51). If it is determined as the full text display mode, the process proceeds to step s52; if not, the process proceeds to step s57. At step s52, the flag is updated to switch the display mode while the management table 107 is searched to retrieve the title entry 108. At the next step s53, it is checked whether the entry 108 has been retrieved successfully. If the retrieval has been made successfully, the process proceeds to step s54; if not, the process proceeds to the display step (step s58) since it means that there are no further entries 108 to be retrieved. At step s54, it is checked whether the value of the hierarchy field 111 of the retrieved entry 108 is equal to "0001" which represents the hierarchy of the major item, and if the values match, the process proceeds to step s55; if not, the process proceeds to step s56. At step s55, the location of the retrieved entry 108 is stored. At step s56, the entry 108 next to the retrieved entry 108 is retrieved, after which the process returns to step s53.

On the other hand, at step s57, the flag is updated to switch the display mode while storing the locations of all entries 108 of the management table 107, after which the process proceeds to the display step (step s58). At the display step s58, the textual data is displayed in accordance with the stored entry locations.

FIG. 9K shows an example of display in the major item only display mode. The major item only display mode allows the operator to grasp the entire text construction on a display of a limited size.

Figure 12:
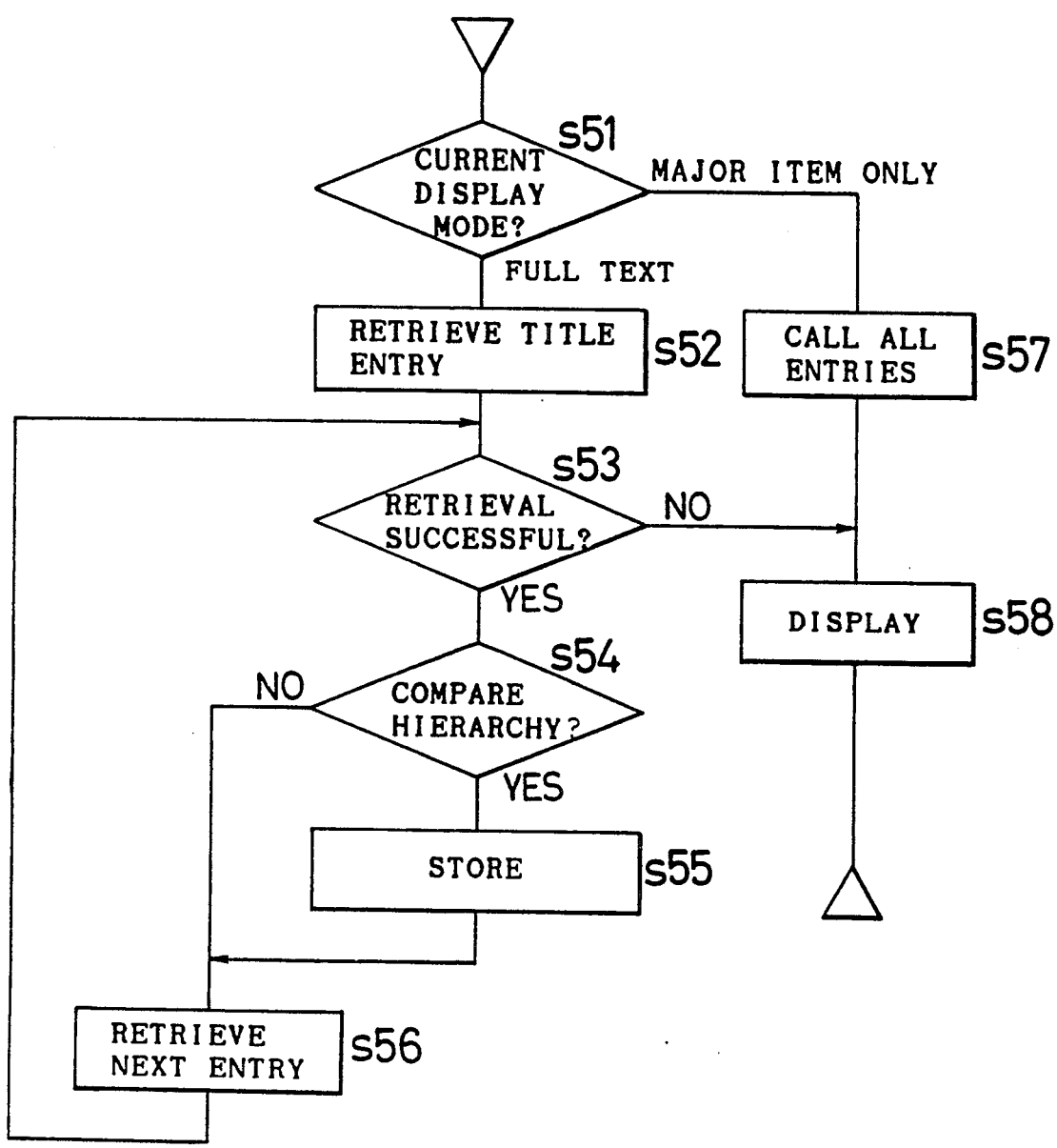

In this embodiment, only the major item only display mode is provided as a display mode for displaying part of textual data, but by making suitable modifications to the processing shown in FIG. 12, it is possible to provide various selective displays such as selective display of medium items subordinate to a certain major item, display of major and medium items only, etc.

Figure 13:
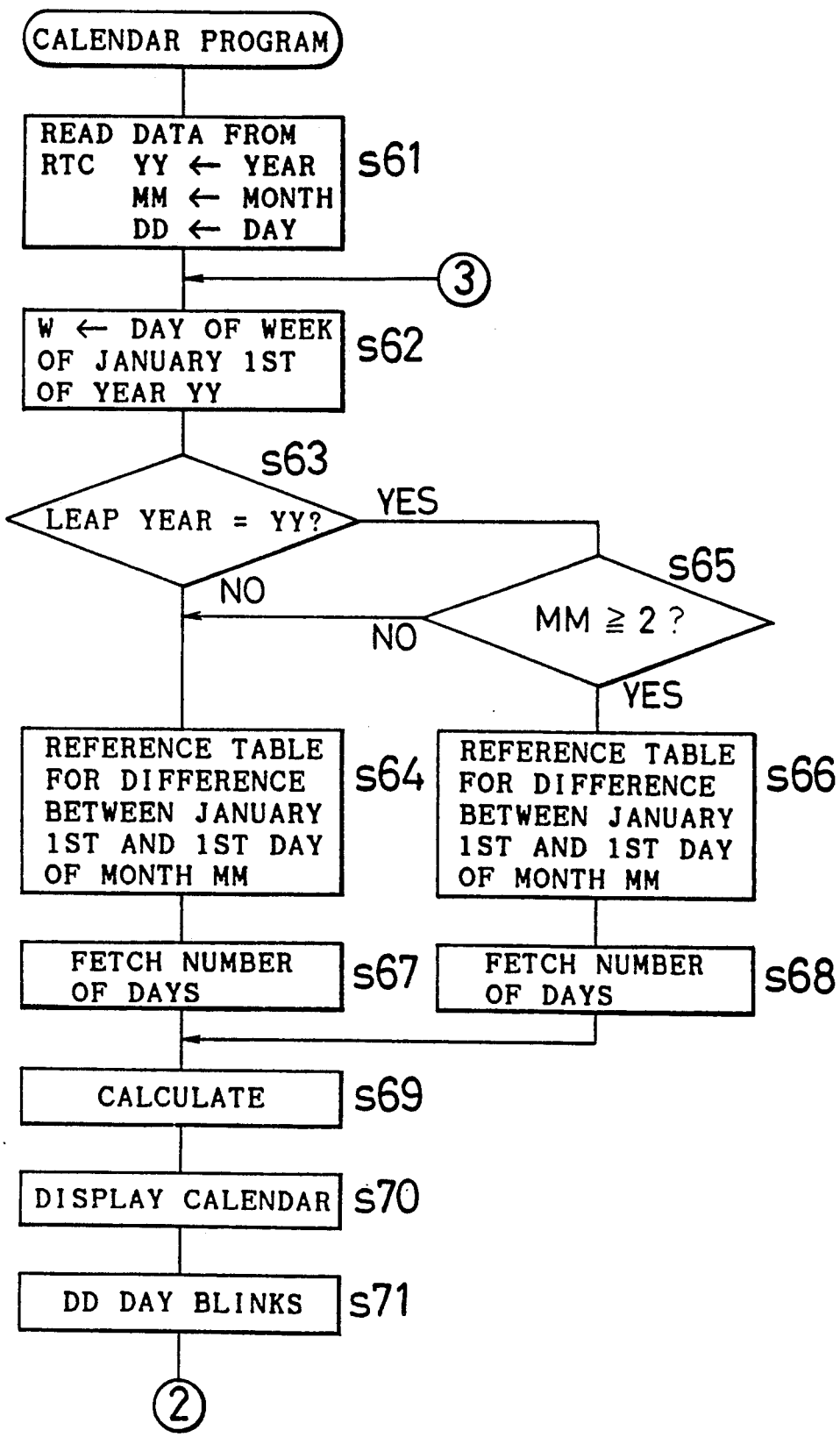
FIGS. 13 and 14 are flowcharts showing the operation of a calendar program.
Figure 14:
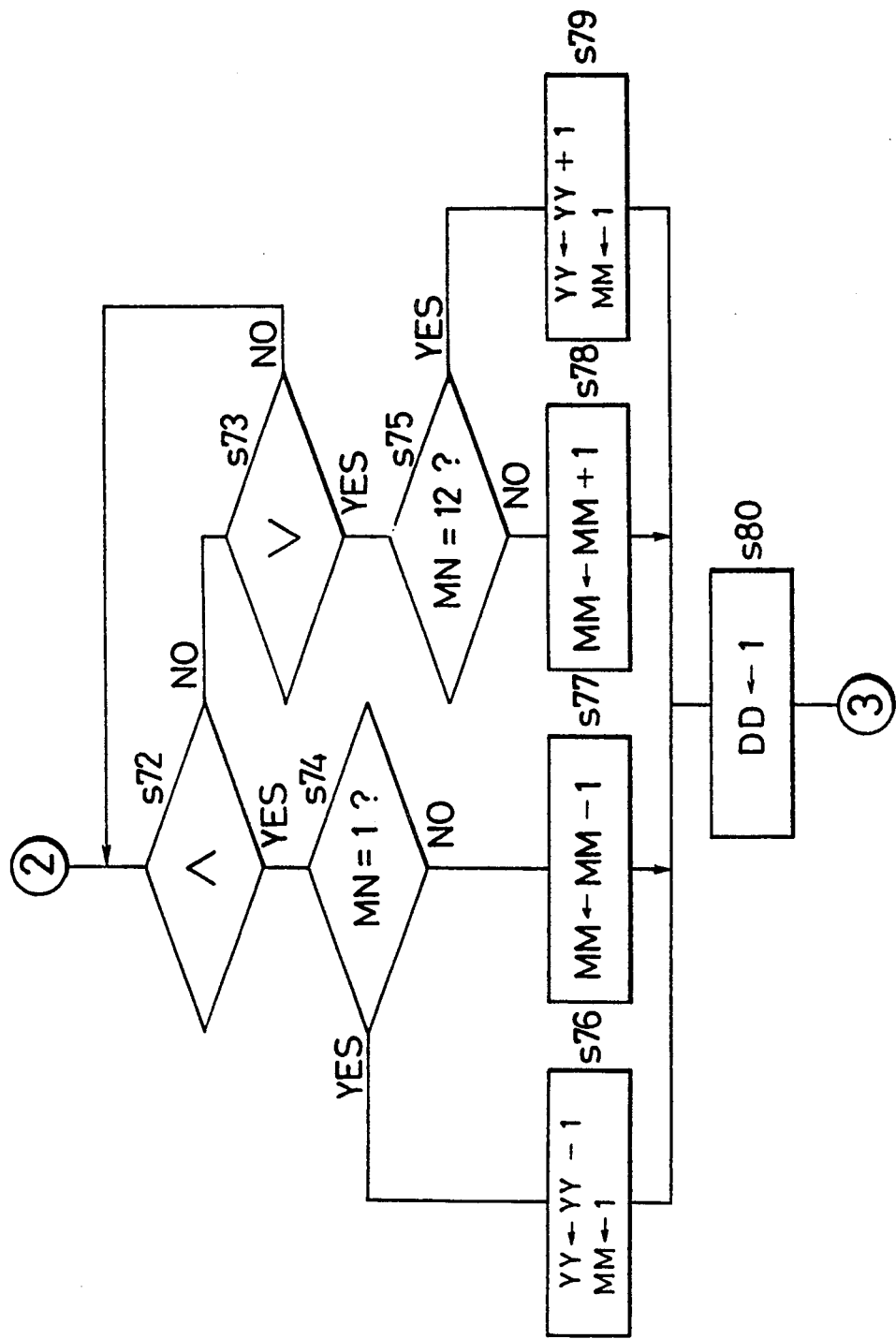

Next, we will describe the operation of the calendar program with reference to FIGS. 13 and 14.

As shown in the flowchart of FIG. 13, the calendar program works first to read the current year and date (e.g., May 1, 1990) from the RTC 11 and substitutes the year, month, and day for variables YY, MM, and DD, respectively (step s61). At step s62, the value representing the day of the week of January 1st of the year YY is read out by referencing the table in the ROM 9, and the value ("0" for Sunday, "1" for Monday, and so on) is substituted for a variable W (since Jan. 1st of 1990 is Monday, "1" is substituted for the variable W). At step s63, it is checked whether the year YY is a leap year; if it is a leap year, the process proceeds to step s65, and if not, the process proceeds to step s64. At step s65, it is checked whether the month MM is a month (MM$\geq$2)

requiring special processing because of a leap year; if the month MM is a month requiring such processing, the process proceeds to step s66, and if not, the process proceeds to step s64. At step s64, a value to calculate the day of the week of the 1st day of the month MM is fetched from the table in the ROM 9 for a non-leap year. For May 1st, for example, this table contains a value "1" which is the result of subtracting 1 from the remainder 2 obtained by dividing 121 by 7, since May 1st is the 121st day from January 1st. At step s66, a value to calculate the day of the week of the 1st day of the month MM is fetched from the table in the ROM 9 for a leap year. At steps S67 and S68, the number of days in the month MM is fetched from the table in the ROM 9 (for example, "31" is fetched for the month of May). At step s69, the value to calculate the day of the week of the 1st day of the month MM is added to the value representing the day of the week of January 1st of the year YY, to obtain the day of the week of the first day of the month MM of the year YY (e.g., since $1+=2$, May 1st of 1990 is Tuesday). Finally, in accordance with the information obtained in the above process, the calendar for the month MM of the year YY is displayed (step s70), and the day DD on the displayed calendar is shown by blinking (step s71).

After displaying the calendar for the month, when a cursor key is operated, the calendar program works to display the calendar for the previous month or the next month, as described below with reference to the flowchart of FIG. 14. At steps S72 and S73, it is checked whether a cursor key is depressed or not; if it is decided that the cursor UP key has been depressed, the process proceeds to step s74, and if it is decided that the cursor DOWN key has been depressed, the process proceeds to step s75. At steps S74 and S75, it is decided whether the current calendar is for the first month (January) of the year or whether it is for the last month (December) of the year, and in accordance with the result of the decision, the process proceeds to one of the steps S76–S79. At steps S76–S79, appropriate values are substituted for the variable YY and/or MM. "1" is substituted for the variable DD (step s80), and the process returns to step s62 of FIG. 13.

Figure 15:
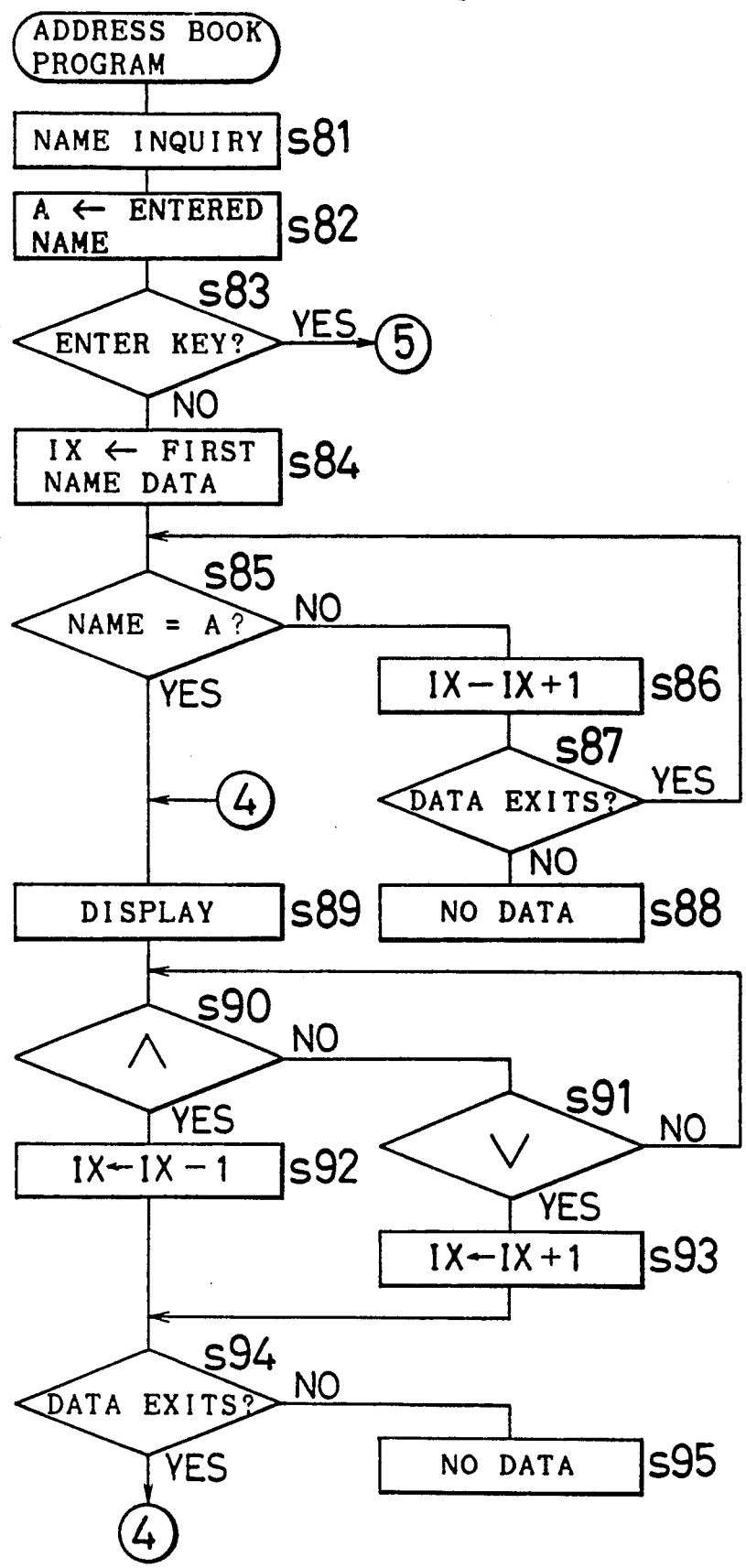
FIGS. 15 and 16 are flowcharts showing the operation of an address book program.
Figure 16:
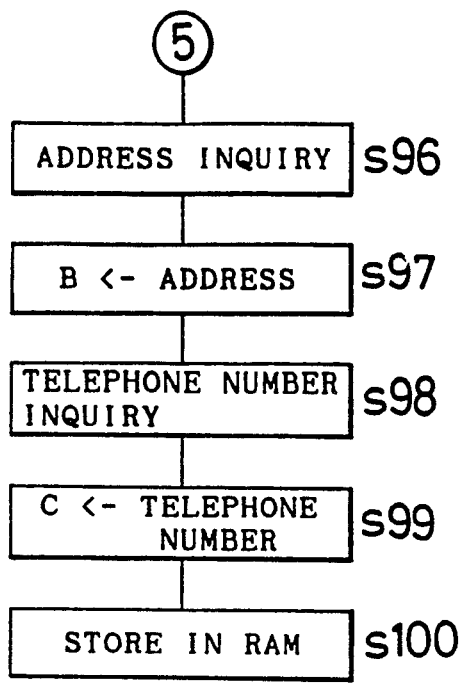

We will now describe the operation of the address book program with reference to FIGS. 15 and 16.

The address book program works first to display the message "Name?" on the LCD 5, prompting the operator to enter the name which is used as the keyword for data search (step s81). At step s82, the entered name is substituted for the variable A. In response to the prompting for input, the operator depresses a cursor key if a search is to be performed by the entered name, and depresses the "enter" key if new address book data for the entered name is to be created. At step s83, it is determined whether the "enter" key has been depressed; if the "enter" key has been depressed; the process proceeds to step s96 of FIG. 16, and if not, the process proceeds to step s84. In the address book memory area 101 of the RAM 10, address book data consisting of the name, address, and telephone number is stored as a set of data. At step s84, the location of the address book data at the top of the address book memory area 101 is stored in IX register. At step s85, it is checked whether the name contained in the address book data indicated by the IX register matches the name substituted for the variable A; if they match, the name, address, and telephone number are displayed (step s89), and if not, 1 is added to the IX register, to store the location of the next address book data in the IX register (step s86). At step s87, it is checked whether address book data exists at the location indicated by the IX register; if no data exists, a message is displayed to the effect that the specified name is not stored (step s88), and if data exits, the name match is checked again at step s85.

After the address book data is displayed at step s89, when a cursor key is operated, the address book data stored before or after the current data is displayed. At steps S90 and S91 of FIG. 15, it is checked whether a cursor key is depressed; if it is decided that the cursor UP key has been depressed, the process proceeds to step s92, and if it is decided that the cursor DOWN key has been depressed, the process proceeds to step s93. At step s92, "1" is subtracted from the IX register to store the location of the preceding address book data in the IX register. On the other hand, at step s93, "1" is added to the IX register to store the location of the next address book data in the IX register. At step s94, it is checked whether address book data exists at the location indicated by the IX register; if data exists, the process returns to the display step (step s89), and if no data exists, a message indicating no data is displayed (step s95).

When the "enter" key has been used for entering the name at step s82, the process proceeds to step s96 of FIG. 16. At step s96, the operator is prompted to enter the address. The entered address is substituted for the variable B (step s97). Next, at step s98, the operator is prompted to enter the telephone number. The entered telephone number is substituted for the variable C (step s99). At step s100, data substituted for the variables A, B, and C is stored after the last address book data stored in the address book memory area in the RAM 10, to complete the registration of the address book data for one person.

Using the address book program, textual data stored in the data exchange memory area 110 by the text creation program can be loaded as address book data using the "call" key.

Next, the operation of the schedule program will be described with reference to FIGS. 17 to 19.

Figure 17:
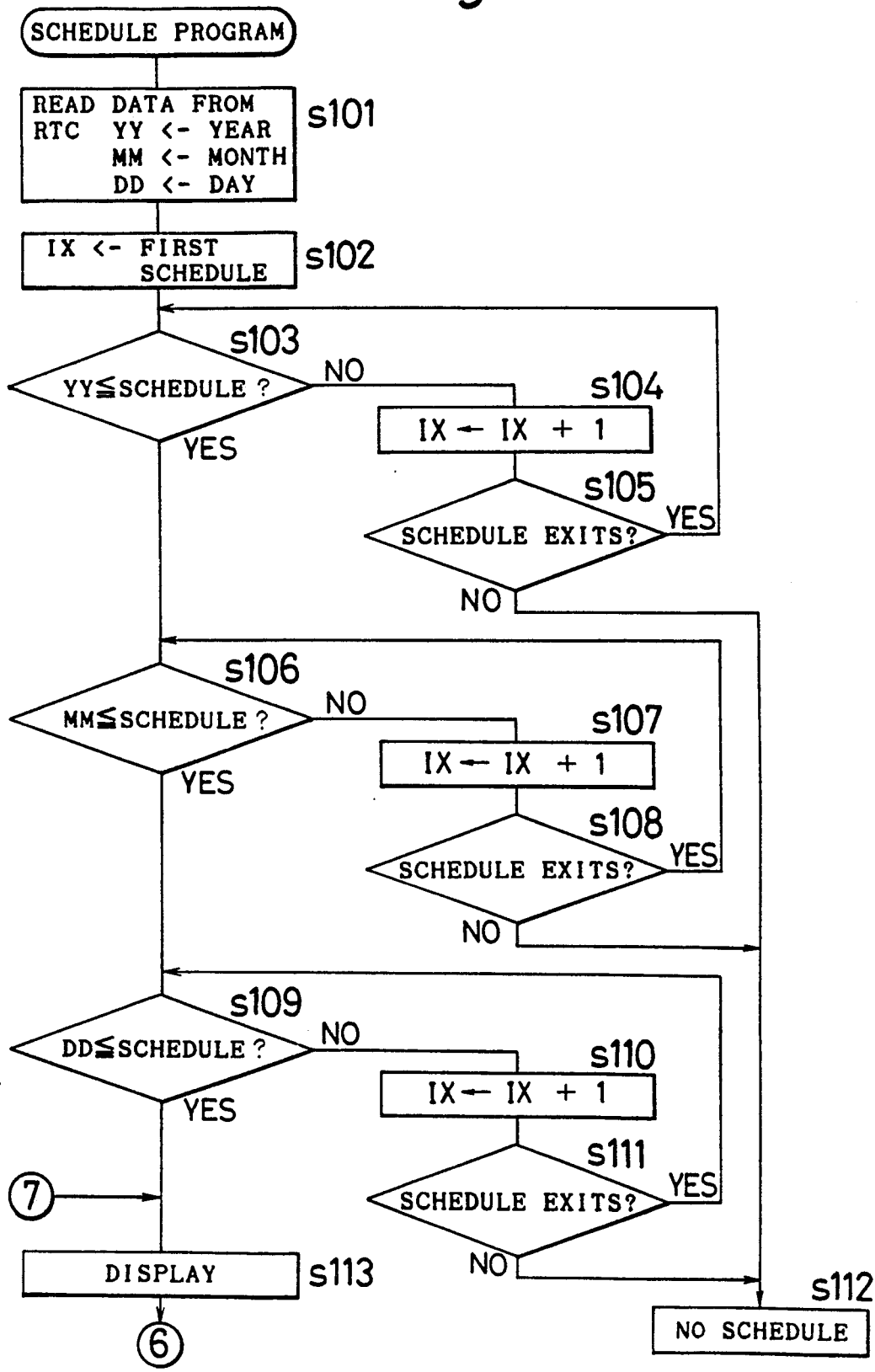

As shown in FIG. 17, the schedule program works first to read the current year and date from the RTC 11 and substitutes the year, month, and day for the variables YY, MM, and DD (step s101). In the schedule memory area (schedule list) 102 in the RAM 10, the previously mentioned schedule data is stored in sequence by date. At step s102, the location of the schedule data stored at the top of the schedule memory area 102 is stored in the IX register. At step s103, it is checked whether the year of the schedule indicated by the IX register is later than the year YY; if the condition is true, the process proceeds to step s106, and if not, the process proceeds to step s104. At step s104, addition is performed so that the location of the next schedule data in the schedule memory area 102 is stored into the IX register. At step s105, it is checked whether schedule data exists at the location indicated by the IX register; if schedule data exists, the process returns to step s103, and if not, a message indicating no schedule is displayed at step s112. As a result of the processing from step s103 through step s105, the schedule data nearest to the current date is retrieved from the future schedule including that for the current year.

Steps S106 to S108 provide a similar loop structure to that of steps S103 to S105 and are used to make judgement about the month of the schedule.

Steps S109 to S111 also provide a similar loop structure to that of steps S103 to S105 and are used to make judgement about the day of the schedule.

At step s113, the retrieved schedule data (including date and schedule item) is displayed.

Figure 18:
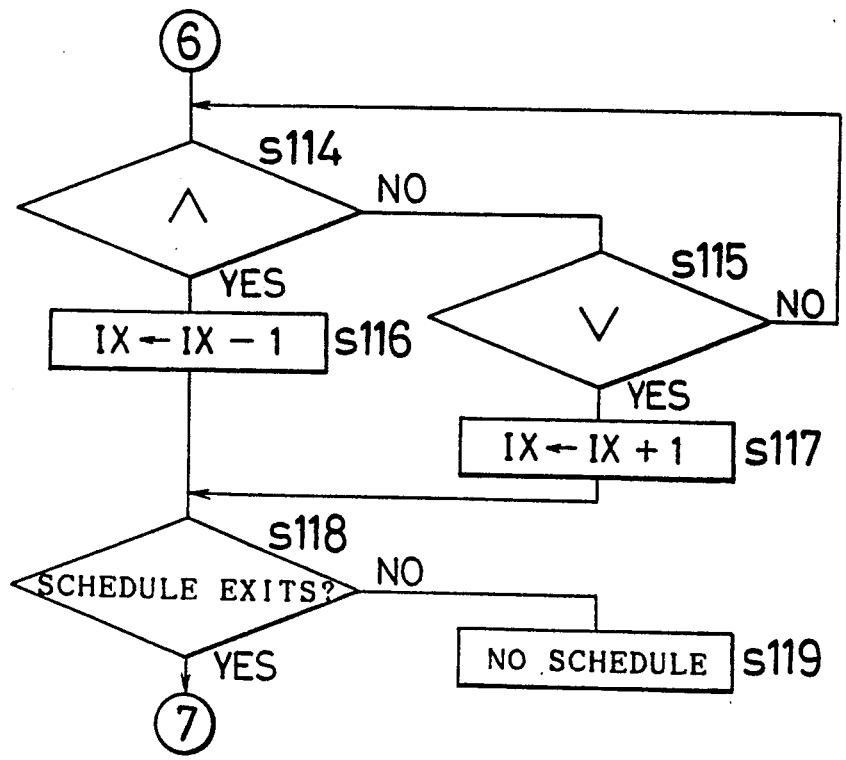
FIGS. 17 to 19 are flowcharts showing the operation of a schedule program.

After the schedule data is displayed at step s113, when a cursor key is operated, the schedule data stored before or after the current schedule data is displayed in accordance with the process shown in FIG. 18. At steps S114 and S115 of FIG. 18, it is checked whether a cursor key is depressed or not; if it is decided that the cursor UP key has been depressed, the process proceeds to step s116, and if it is decided that the cursor DOWN key is depressed, the process proceeds to step s117. At step s116, "1" is substracted from the IX register, to store the memory location of the preceding schedule data into the IX register. On the other hand, at step s117, "1" is added to the IX register, to store the location of the next schedule data into the IX register. At step s118, it is checked whether schedule data exists at the location indicated by the IX register; if schedule data exists, the process returns to the display step (step s113), and if no schedule exists, a message indicating no schedule is displayed (step s119).

Figure 19:
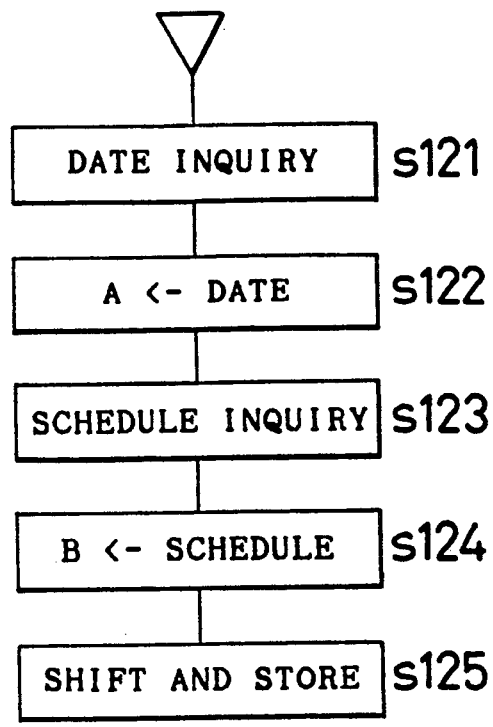

When a clear key "C" is depressed during the operation of the schedule program, the process jumps to step s121 of FIG. 19 to enter the schedule input mode. At step s121, the operator is prompted to enter the date of schedule. The entered date is substituted for the variable A (step s122). Next, at step s123, the operator is prompted to enter the schedule item. The entered schedule item is substituted for the variable B (step s124). At step s125, the entered schedule date is compared with the schedule dates stored in the schedule memory area 102 to determine the location in the schedule memory area 102 at which to store the entered schedule data, and the schedule after that location is shifted so as to secure an area in which to store the schedule data entered at that location, thus storing the entered schedule data into the memory area thus secured.

In the schedule input mode, textual data stored in the data exchange memory 110 by the text creation program can also be read into the schedule using the "call" key.

Figure 20:
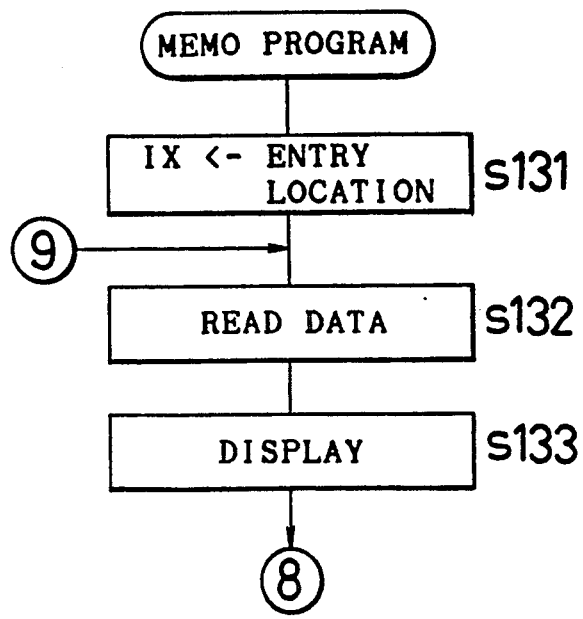
FIGS. 20 to 22 are flowcharts showing the operation of a memo program.
Figure 21:
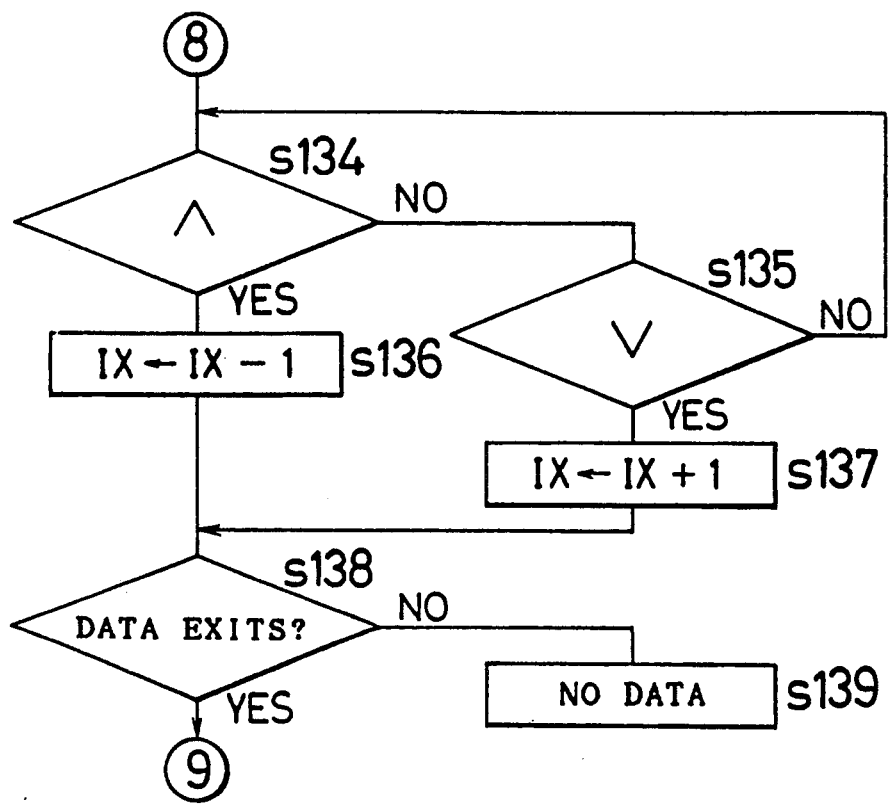
Figure 22:
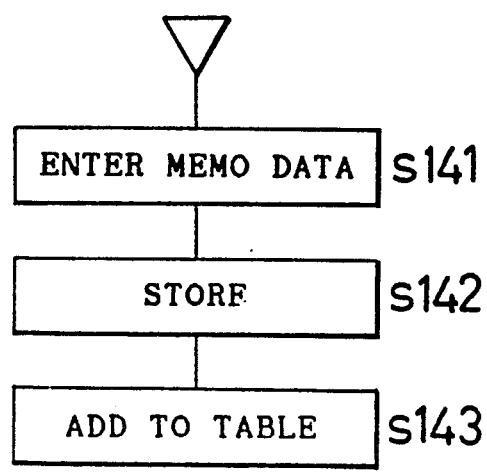

Referring now to FIGS. 20 to 22, we will describe the operation of the memo program. As shown in FIG. 20, the memo program works first to load into the IX register the location of the entry storing the location and character number of the last memo data stored in the table 104 that manages the start position in the memo data memory area 103 and the number of characters of each memo data stored in the memory area 103 in the RAM 10 (step s131). Next, using the contents of the IX register and the contents of the table 104, the desired memo data is read out of the memo data memory area 103 (step s132), and the thus read-out data is displayed (step s133).

After the memo data is displayed in step s133, when a cursor key is operated, the memo data stored before or after the current memo data is displayed in accordance with the process shown in FIG. 21. At steps S134 and S135 of FIG. 21, it is checked whether a cursor key is depressed or not; if it is decided that the cursor UP key has been depressed, the process proceeds to step s136, and if it is decided that the cursor DOWN key is depressed, the process proceeds to step s137. At step s136, "1" is subtracted from the IX register, to load into the IX register the location of the entry of the table 104 storing the start position and the number of characters of the preceding memo data. On the other hand, at step s137, "1" is added to the IX register, to load into the IX register the location of the entry of the table 104 storing the start position and the number of characters of the next memo data. At step s138, it is checked whether memo data exists in the table entry indicated by the IX register; if data exists in the table entry, the process returns to the memo data read step (step s132), and if no data exists, a message indicating no data is displayed (step s139).

When a character key or a numeric key is operated during the operation of the memo program, the process jumps to step s141 of FIG. 22 to enter the memo data input mode. At step s141, memo data is entered, followed by the depression of the "enter" key to store the entered memo data after the last memo data stored in the memo data memory area 103 (step s142). At step s143, the entry storing the start position and the number of characters of the memo data stored at step s142 is added to the table 104.

In the memo data input mode, textual data stored in the data exchange memory area 110 by the text creation program can also be read as memo data using the "call" key. Since the data exchange memory area 110 stores textual data with delimiters, the memo program can display the loaded textual data on the LCD 5 using the delimiters to provide carriage returns at appropriate points.

Finally, we will describe the operation of the application program contained in the memory card 7 of FIG. 3 as an example of an application program supplied by a memory card. As previously mentioned, key symbols are printed on the memory card 7. The key symbols do not actually function as keys, but for the sake of simplicity, the following description deals with the key symbols as if they function as keys.

Figure 23A:
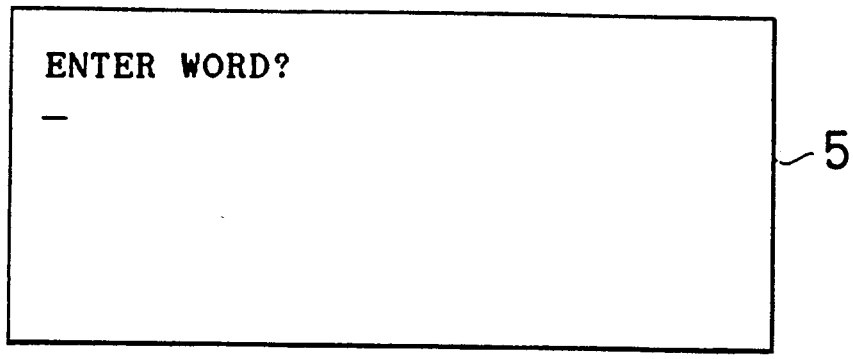
Figure 23B:
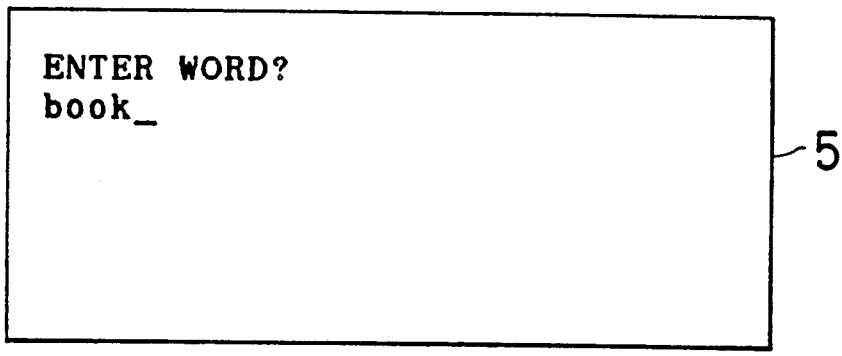
Figure 23C:
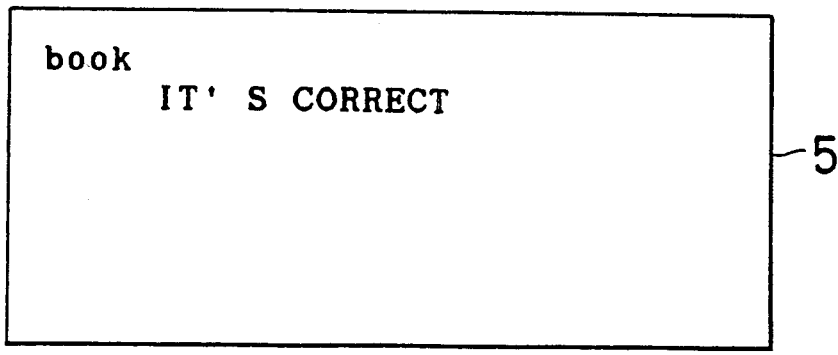

The application program in the memory card 7 of FIG. 3 is an English dictionary program with a spelling check function. This program starts by displaying an "ENTER WORD" prompt on the LCD 5, as shown in FIG. 23A. After a word is entered, as shown in FIG. 23B, when the "CORRECT" key 701 on the memory card is depressed, the dictionary contained in the memory card 7 is searched for the entered word. When the word is found in the dictionary, the message "IT'S CORRECT" is displayed, as shown in FIG. 23C, notifying the operator that the entered word is spelled correctly.

Next, when the "ALTERNATIVE" key 702 on the memory card 7 is depressed, the words having similar spellings to that of the entered word and the number of such words are displayed, as shown in FIG. 23D. Also, when the "DEFINITION" key 703 is depressed, the definition of the entered word is displayed, as shown in FIG. 23E. With the word definition displayed as shown in FIG. 23E, when the "SYNONYM" key 704 on the memory card 7 is depressed, synonyms of the entered word are displayed, as shown in FIG. 23F. The cursor keys 707 and 708 on the memory card 7 are used to scroll the display on the LCD 5. The "HYPHEN" key 705 is a key used to display the entered word divided into syllables, while the "?" key 706 is used to enter the character "?" in place of an unknown character in the word being entered. Since the comparison for a character match with the words in the dictionary is skipped on the character positions of "?" in the entered word during the search for the entered word, using the character "?" makes it possible to search for a word the spelling of which the operator is unsure of.

Another embodiment of the invention will now be described.

Figure 24:
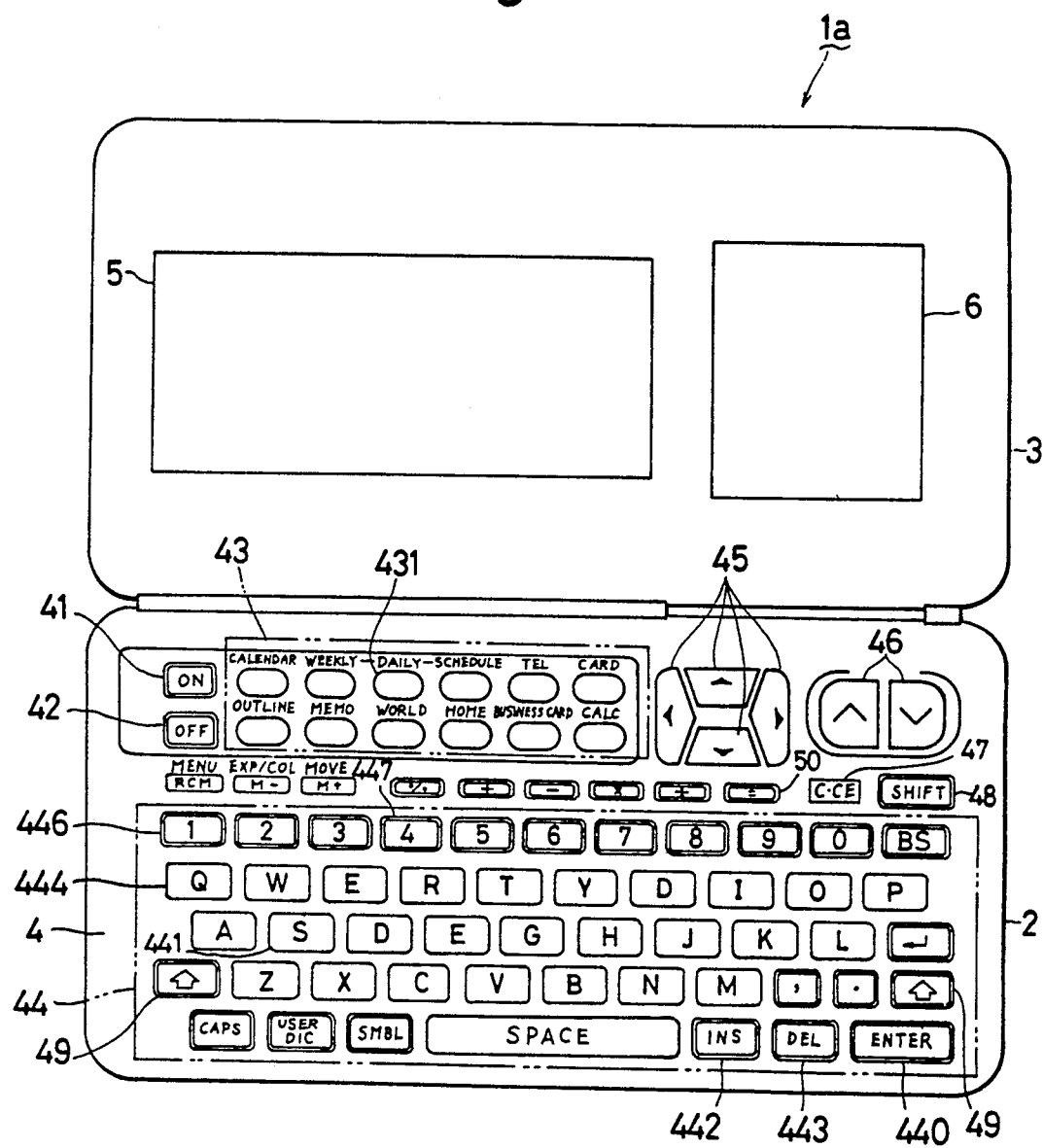
FIG. 24 is a plan view showing the external appearance of another embodiment of the invention.

FIG. 24 shows an external plan view of another embodiment of the invention. This embodiment is a small electronic apparatus generally known as an "electronic organizer". The construction of this embodiment is essentially the same as that of the small electronic apparatus 1 of the foregoing embodiment, but since the construction is partially different, the construction of this embodiment will be described in full. It should also be noted that the reference numerals are essentially the same between the two embodiments but partially different.

The electronic organizer 1a shown in FIG. 24 consists of a main body 2 and a main body cover 3. FIG. 24 shows the electronic organizer 1a with the main body cover 3 opened.

The main body 2 is provided with a keyboard 4 having an "ON" key 41 to turn on power and an "OFF" key 42 to turn off power. A mode selector section 43 includes keys for switching the modes or selecting the application program to be executed. A data input section 44 comprises alphabetic keys including an [S] key 441, numeric keys including an [1] key 446 and a [4] key 447, an [ENTER] key 440 to determine the entry of data, and other keys. The keyboard 4 also includes cursor keys 45 for moving the cursor displayed on the liquid crystal display hereinafter described, search .xq2126 keys 46 for searching for data, a [C≧CE] key 47 for cancelling the processing, a [SHIFT] key 48 for enabling the second functions assigned to specific keys, arrow keys 49, and an [=] key 50. A [H] key 442 functions as a [HELP] key when operated immediately after the [SHIFT] key 48. A [U] key 443 functions as a [SEEK] key when operated immediately after the [SHIFT] key 48. A [Q] key 444 functions as an [EDIT] key when operated immediately after the [SHIFT] key 48. Also, the [=] key 50 functions as an [ALARM] key when operated immediately after the [SHIFT] key 48. In the following description, when any of the keys having the above-said second functions is operated immediately after the [SHIFT] key 48 in order to perform its second function, the key is referred to using the name of its second function. For example, when the [H] key 442 is operated immediately after the [SHIFT] key 48, the [H] key 442 is referred to as the [HELP] key 442.

Provided on the main body cover 3 are a liquid crystal display (LCD) 5 capable of displaying a plurality of lines and a transparent keyboard 6. Other types of display device having a low power dissipation may be used instead of the LCD 5. A memory card containing an application program for expansion of the function of the electronic organizer 1a is inserted into position through a slot (not shown) near the hinge on the back of the main body cover 3 in such a way that the front face of the memory card can be seen through the transparent keyboard 6. The transparent keyboard 6 is used when executing the application program contained in the memory card.

Figure 25:
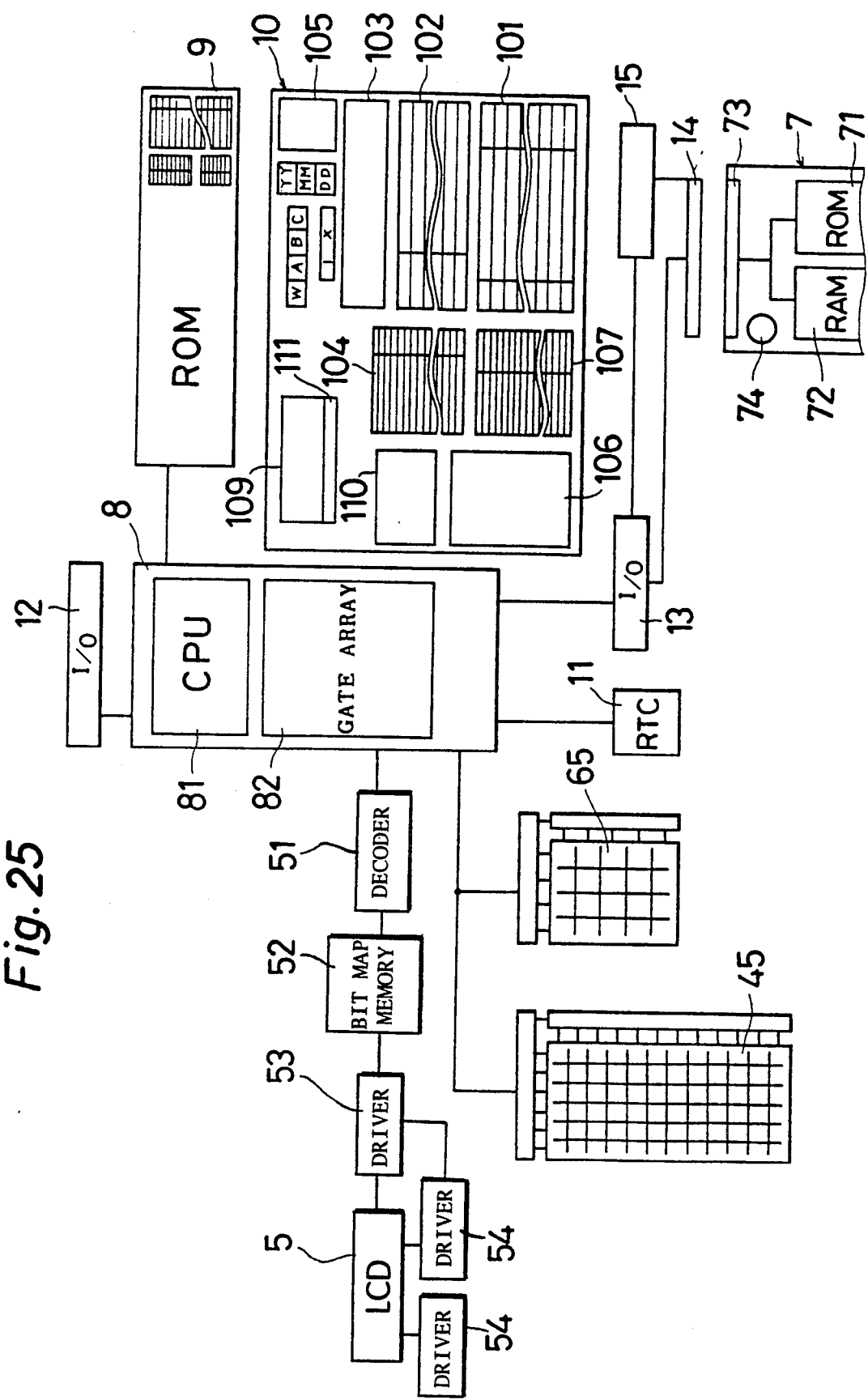
FIG. 25 is a block diagram showing the hardware configuration of the embodiment.

FIG. 25 shows the hardware configuration of the electronic organizer 1a. A control section 8 for controlling the electronic organizer 1a contains a CPU 81 and a gate array 82. The LCD 5 shown in FIG. 24 is connected to the control section 8 via a decoder 51, a bit map memory 52, a common driver 53, and a segment driver 54. The data to be displayed on the LCD 5 is supplied from the control section 8 to the decoder 51. The decoder 51 decodes the data and writes it into the bit map memory 52. The bit map memory 52 is a memory in which one bit is assigned to every dot of the LCD 5, the bits corresponding to the dots to illuminate being set to "1" and the other bits being set to "0". The common driver 53 and the segment driver 54 are used to display characters, graphics, etc. on the LCD 5 according to the contents stored in the bit map memory 52.

The reference numeral 45 shows a key matrix for detecting key entries from the keyboard 4, while the reference numeral 65 indicates a key matrix for detecting key entries from the transparent keyboard 6.

Also connected to the control section 8 are a real time clock (RTC) 11, an expansion terminal 12 for connecting an electronic apparatus such as a printer, a personal computer, or an electronic organizer of the same type as that of this embodiment, and an expansion terminal 13 dedicated for a memory card. Connected to the expansion terminal 13 are a male connector 14 to which the female connector 73 of the memory card 7 is connected and a detector 15 for detecting the connection of the male connector 14 to the female connector 73 of the memory card 7.

Furthermore, a ROM 9 and a RAM 10 backed up by a battery not shown are connected to the control section 8. The ROM 9 stores a basic program for performing basic functions including handling of data input from the keyboard 4 and the transparent keyboard 6 and displaying on the LCD 5; a plurality of application programs for performing a calendar display function, a telephone book function, a text creation function, a schedule management function, a memo function, a business card file function, etc.; and a plurality of tables having fixed contents used in application programs for calendar display, etc. The RAM 10 is used to store variable information needed by the application programs stored in the ROM 9, data created by using the application programs, etc. The RAM 10 has a telephone book memory area 101, a schedule memory area 102, a memo data memory area 103, a table 104 for managing the information relating to the memo data stored in the memo data memory area 103, a mode memory area 105 for storing the various modes, a textual data memory area 106, a management table 107 for managing hierarchical relationships, etc. of the textual data stored in the text memory area 106, a business card memory area 109, and a data exchange memory area 110 for exchanging data between the application programs. The RAM 10 also has areas for storing various variables, pointers, and flags. Furthermore, the RAM 10 has a temporary memory area 111 used for data search.

Figure 26:
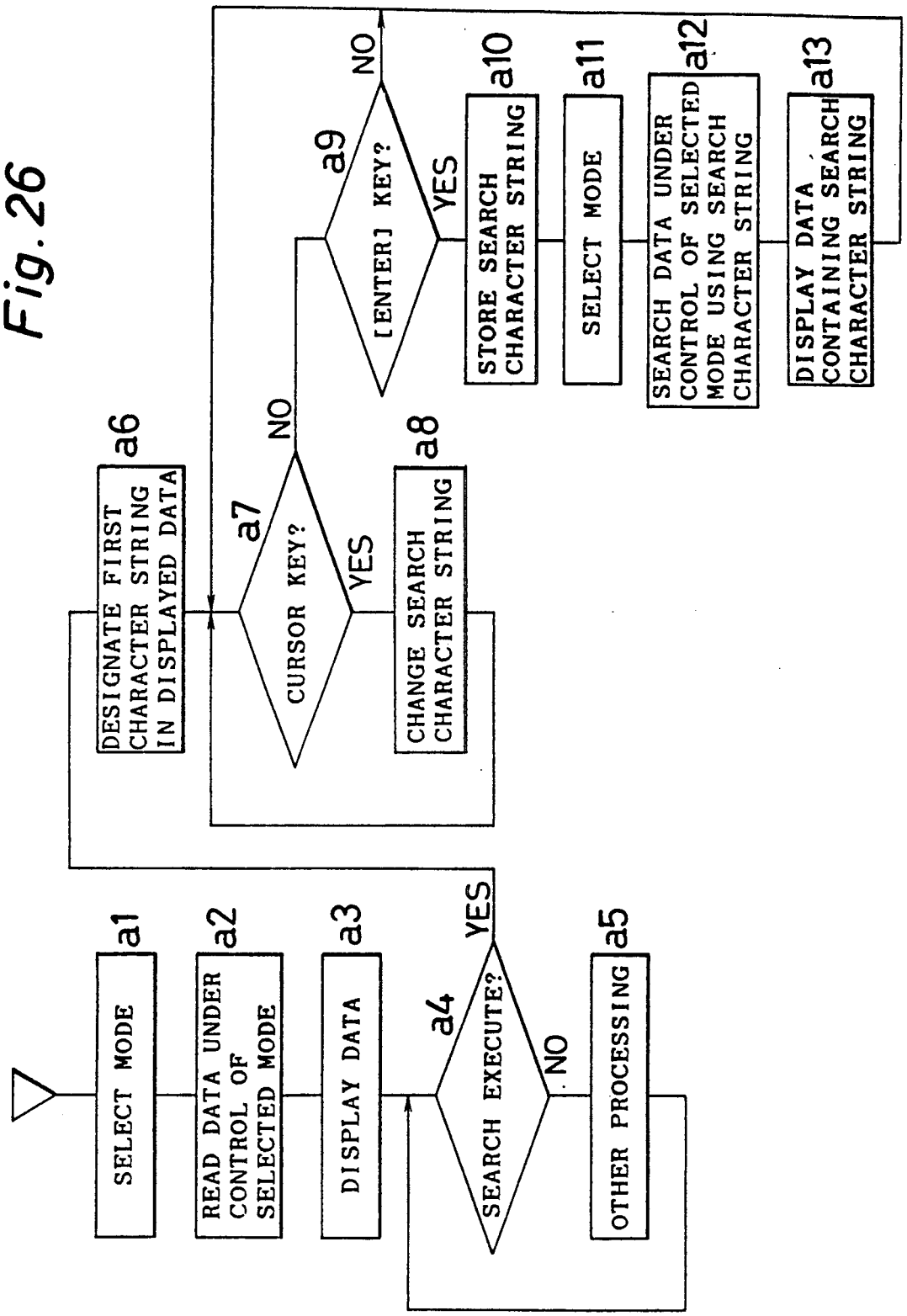
FIG. 26 is a flowchart explaining data search processing according to the embodiment.

Referring to the flowchart of FIG. 26, we will now describe a procedure for data search in accordance with this embodiment.

When the operator selects a mode at step a1, an application program corresponding to the selected mode is started, and data under the control of the selected mode is loaded (step a2). At step a3, the loaded data is displayed on the LCD 5. At step a4, it is checked whether execution of data search is specified. In this embodiment, the operator depresses the [SHIFT] key 48 and the [SEEK] key 443 successively to specify execution of data search. When data search is not specified, the process proceeds to step a5 to perform processing such as switching of display data, input of new data, etc.

When execution of data search is specified at step a4, the data search mode is entered, the process proceeding to step a6. At step a6, the first character string in the displayed data separated by a blank is automatically specified as the search character string which serves as the keyword for data search, the specified search character string being displayed in reverse video on the LCD 5.

At step a7, it is checked whether an instruction to move the cursor is issued. If an instruction to move the cursor is issued, the process proceeds to step a8 to change the search character string. In this embodiment, there are two modes of cursor movement, and the processing at step a8 is different according to the mode of cursor movement. One mode is when one of the cursor keys 45 is depressed, in which case another character string separated by a blank is specified as a new search character string, in accordance with the direction indicated by the depressed cursor key 45. The other mode is when one of the arrow keys 49 and one of the cursor keys 45 are depressed simultaneously, in which case the character in the direction indicated by the depressed cursor key 45 is added to the current search character string.

When no instruction for cursor movement is issued at step a7, the process proceeds to step a9 in which it is checked whether the [ENTER] key 440 is depressed. If the [ENTER] key 440 is depressed, the process proceeds to step a10, an1 if not, the process returns to step a7. At step a10, the specified search character string is stored into the temporary memory area 111. In the meantime, a message is displayed on the LCD 5, prompting the operator to select the mode under which data search is to be performed.

When the mode is selected at step a11, the process proceeds to step a12 in which the data containing the search character string is retrieved from the data under the control of the selected mode. At step a13, the retrieved data is displayed. Thereafter, the process returns to step a7.

As is apparent from the above description, this embodiment permits data retrieval in such a manner that, for example, a search character string is designated in a certain mode, a search is performed in another mode using that search character string, a search character string is designated in that other mode, and a search is performed in still another mode using the latter search character string.

In this embodiment, the processing after entering the search mode is performed successively as a series of process specifically reserved for data retrieval, but the following modification can be considered. In this modification, the search character string designated in a certain mode is stored in the temporary memory area 111. Thereafter, regardless of the designation of the search character string, when another mode is entered and execution of data retrieval is specified, the operator is prompted determines whether to fetch the search character string from the temporary memory area 111 or to enter a new search character string from the keyboard 4.

FIGS. 27A to 27N show examples of displays for data search operation according to this embodiment. FIG. 27A shows that data is displayed in the telephone book mode. When the [SHIFT] key 48 and the [SEEK] key 443 are depressed for execution of data search, the first character string "HAMILTON" in the displayed data is automatically designated as the search character string and is displayed in reverse video, as shown in FIG. 27B. When the cursor DOWN key 45 is depressed four times, the search character string is changed to the character string "ABC" four lines below (FIG. 27C). In this situation, when the arrow key 49 and the cursor RIGHT key 45 are depressed simultaneously several times, the search character string is extended to the right as shown in FIG. 27D. Next, when the [ENTER] key 440 is depressed, the search character string is stored into the temporary memory area 111, while a list of mode names is displayed on the rightmost side of the screen, as shown in FIG. 27E. In this example, the operator selects the schedule mode by depressing the [1] key 446. When the mode is selected, a search beings and a message indicating that the search is being performed is displayed during the search operation, as shown in FIG. 27F. When data containing the search character string is found, the retrieved data is displayed on the LCD 5, as shown in FIG. 27G. Although not shown in the flowchart in FIG. 26, it is possible to continue search in the current mode for other data containing the search character string by depressing the [SHIFT] key 48 and the search key 46. FIG. 27H shows the display when applicable data was not found as a result of the search carried out by such a key operation. In FIGS. 27I to 27M, the operator changes the search character string in the schedule mode and uses the search character string for data search in the memo mode. FIG. 27M shows the result of the data search in the memo mode. Although not shown in the flowchart of FIG. 26, it is possible to exit the search mode by depressing the [C≧CE] key 47 at the stage of the program in which alteration of the search character string is permitted as shown in FIG. 27M. FIG. 27N shows the display after the [C≧CE] key 47 has been depressed in the situation of FIG. 27M.

Figure 28A:
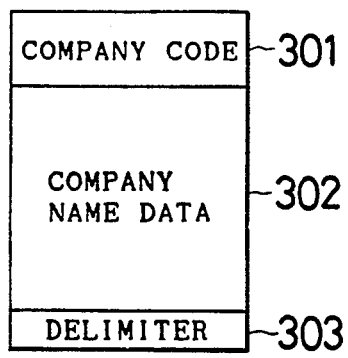
FIG. 28 is a diagram schematically showing how data is stored by a business card file program according to the embodiment.
Figure 28B:
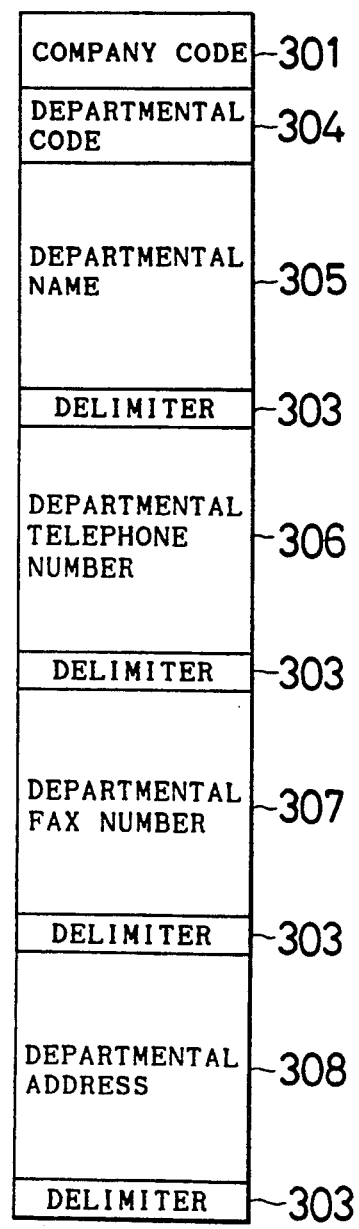
Figure 28C:
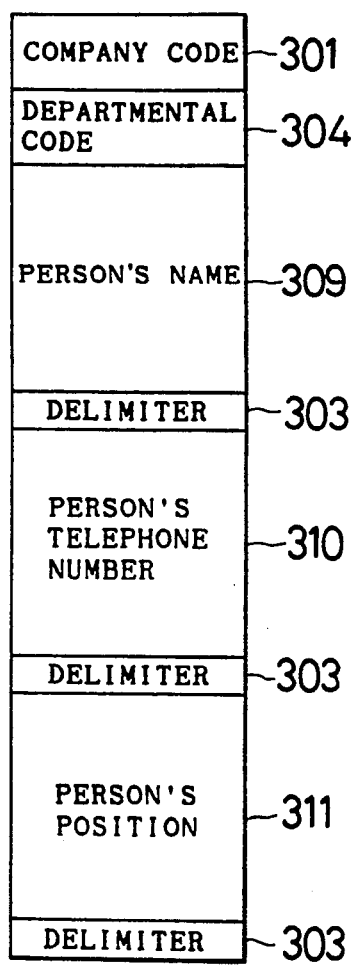

Next, we will described the business card file function provided by the business card file program included in the application programs of the electronic organizer 1a. Referring to FIGS. 28(a) to (c), we will first describe how business card data is stored in the business card data memory area 109. FIG. 28(a) shows a piece of company data. The company data comprises a company code 301 and a company name data 302. The company code 301 is fixed-length data, but since the company name data 302 is variable-length data, individual pieces of company data are separated from each other by a delimiter. There are as many pieces of company data as the number of companies stored. When the operator enters a new company name in creating business card data using the business card file program, new company data is created in the business card data memory area 109. At this time, the company code 301 is automatically attached by the business card file program.

FIG. 28(b) shows a piece of departmental data. The departmental data comprises a company code 301, a departmental code 304, a departmental name 305, a departmental telephone number 306, a departmental FAX number 307, and a departmental address 308. The departmental data is related to the company data by the company code 301. There are as many pieces of departmental data as the number of companies stored. When the operator enters a new departmental name for a certain company in creating business card data using the business card file program, new department data is created in the business card data area 109. At this time, the departmental code 304 is automatically attached by the business card file program.

FIG. 28(c) shows personal data for one person. The personal data comprises a company code 301, a departmental code 304, a person's name 309, a person's telephone number 310, and a person's official position 311. The personal data is related to the company data by the company code 301 and to the departmental data by the departmental code 304.

As described, the company data and the departmental data are stored separately from the personal data, the effect of which is that it not only takes less space in the memory area than when the company name, departmental name, etc. are duplicated among a plurality of personal data, but also facilitates data search hereinafter described. It will be appreciated that it is also possible to store personal data with company data and departmental data included therein, instead of storing the business card data as mentioned above.

Figure 29:
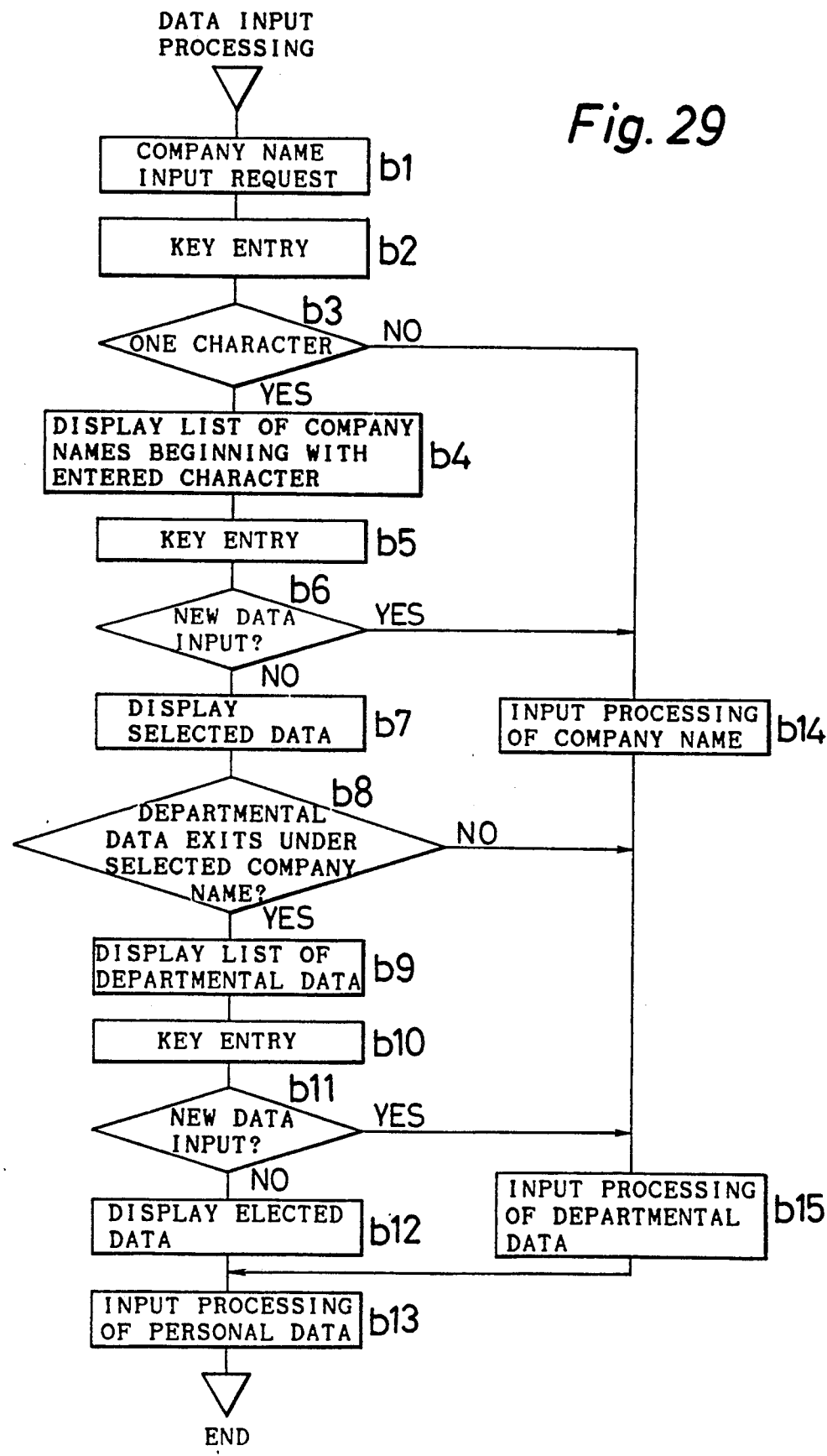
FIG. 29 is a flowchart explaining a procedure for entering business card data in the business card file program.

Referring to FIG. 29, we will describe a procedure for entering business card data using the business card file program. When the business card file program is started, a message prompting the operator to enter a company name is displayed (step b1). At step b3, it is checked whether the data entered at step b2 consists of one character; if it consists of one character, the process proceeds to step b4, and if it consists of more than one character, the process proceeds to step b14.

At step b4, company names beginning with the character entered at step b2 is read from the business card data memory area 109 for display as a list. The display also includes an option for entering a new company name not included in the list. Next, it is checked at step b6 whether the key entry made at step b5 is for selecting an input of a new company name; if it is for inputting a new company name, the process proceeds to step b14, and if not, that is, if a company name is selected from the displayed list, the process proceeds to step b7. At step b7, the selected company name is displayed as the entered company name. On the other hand, at step b14, processing of a keyed-in company name is performed. When the company name entered at step b14 is not yet registered in the business card memory area 109, new company data as shown in FIG. 28(a) is created.

Next, the business card memory area 109 is examined to check whether the departmental data corresponding to the selected company name is registered (step b8). If the departmental data is registered, the process proceeds to step b9 to display a list of the registered departmental data. The display also includes an option for entering new departmental data not included in the list. On the other hand, if no departmental data is registered, the process proceeds to step b15. After displaying the list at step b9, it is checked at step b11 whether the key entry made at step b10 is for selecting an input of new departmental data; if new departmental data input is selected, the process proceeds to step b15, and if not, that is, if departmental data is selected from the displayed list of departmental data, the process proceeds to step b12. At step b12, the selected departmental data is displayed as the entered departmental data. On the other hand, at step b15, processing of keyed-in departmental data is performed. When the departmental data is not yet registered in the business card data memory area 109, new departmental data as shown in FIG. 28(b) is created. At step b13, input processing of personal data is performed. With the above procedure, input of business card data for one person is completed.

As is apparent from the above description, according to the business card file program of this embodiment, a list of company names already stored in other business card data is displayed when entering a company name, and thus, the company name to be entered can be selected from the displayed list. Therefore, when the company name to be entered is a one already registered, the company name can be entered by a very simple operation. For departmental data also, since a list of registered data is displayed from which the desired departmental name can be selected, entering departmental data is also very simple, as in the case of entering a company name.

Also, it can be so adapted that when entering a company name, a list of registered company names is displayed by depressing a specific function key. Further, the function to display a list of registered data and select desired data from the displayed list can also be applied to other programs requiring data input.

Figure 30A:
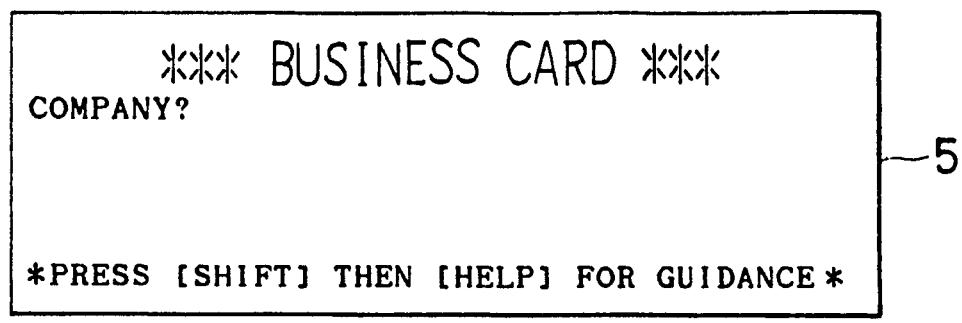

FIGS. 30A to 30J show examples of displays during execution of the business card file program. FIG. 30A shows the display when the business card file program is started. As shown, the display is prompting the operator to enter a company name.

Figure 30B:
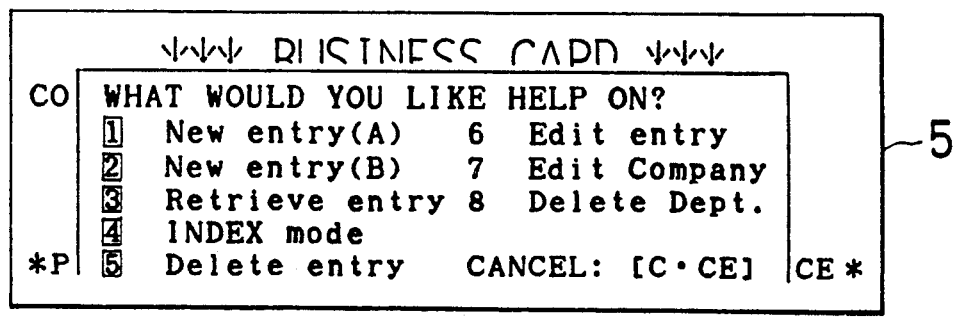

Although not shown in the flowchart of FIG. 29, when the [SHIFT] key 48 and the [HELP] key 442 are operated successively with the display of FIG. 30A on the screen, a help menu is brought on the screen as shown in FIG. 30B.

Figure 30C:
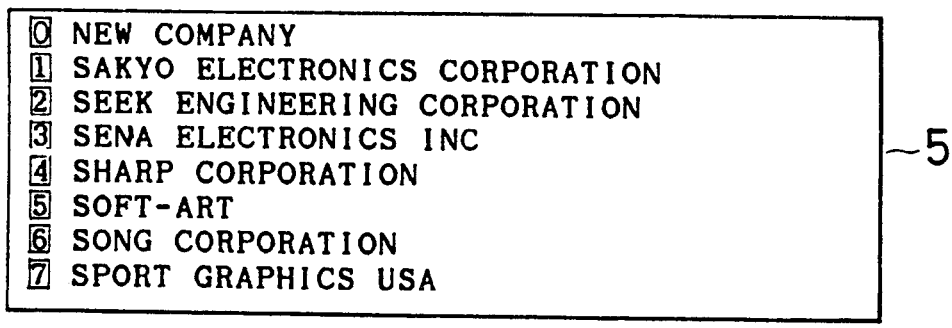

With the display of FIG. 30A or FIG. 30B on the screen, when the [S] key 441 and the [ENTER] key 440 are depressed, a list of registered company names beginning with the character "S" is displayed as shown in FIG. 30C. When a company name is selected by depressing the [4] key 447, the selected company name is displayed on the company name field as shown in FIG. 30D, with a list of departmental data registered under the company name being displayed. When departmental data is selected by depressing the [1] key 446, the selected departmental data is displayed, as shown in FIG. 30E, with a message prompting the operator to enter a name.

FIG. 30F shows a display after the name has been entered. A message is displayed prompting the operator to enter the person's position. FIG. 30G shows a display after the position has been entered. A message is displayed prompting the operator to enter the telephone number. When the telephone number is entered, as shown in FIG. 30H, followed by the depression of the [ENTER] key 440, a message appears indicating that the entered business card data is being saved, as shown in FIG. 30I, after which the entered business card data is displayed in the prescribed format as shown in FIG. 30J.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A portable electronic text creation and storage device having a display with a limited display area and a keyboard with a limited number of keys corresponding to various text creation symbols for permitting an operator to create and store text in a hierarchy of text levels beginning with a highest hierarchical text level followed by one or more subordinate hierarchical text levels by selectively depressing the keys on the keyboard, comprising:

a text memory for storing strings of text data entered by the operator using the keyboard;

a text management memory having a hierarchy field for each stored string of text data for storing a corresponding hierarchical text level and having a subordinate field for storing subordinate text information indicating whether a subsequent string of text data at a subordinate hierarchical text level exists;

means for displaying on the display a first indicator near each displayed string of text data in accordance with the corresponding hierarchical text level and a second indicator near each displayed subordinate string of text data in accordance with the corresponding subordinate hierarchical text level;

a selection key on the keyboard actuable by the operator for selecting a hierarchical text level; and means for storing in the text memory one or more strings of text data entered by the operator and for storing in the text management memory for each entered string of text data the selected hierarchical text level and subordinate text information indicating whether the entered string of text data is followed by a string of subordinate text data.

2. The device according to claim 1, further comprising:

an insert key for adding a string of text data at the selected hierarchical text level.

3. An electronic text creation device having a display with a limited display area and a keyboard with a limited number of keys corresponding to various text creation symbols for permitting an operator to create, store, and process text in a hierarchy of text levels beginning with a highest hierarchical text level followed by one or more subordinate hierarchical text levels by pressing keys on the keyboard, comprising:

a text memory for storing text creation symbols entered on the keyboard as strings of text data;

a text management memory having a hierarchy field corresponding to each string of text data for storing one of the hierarchical text levels and having a subordinate field for storing a flag indicating whether a subsequent string of text data at a subordinate hierarchical text level exists;

a selection key actuable by the operator for selecting an initial string of text data displayed at a particular hierarchical level;

means for automatically determining a range of text strings including text strings at hierarchical levels subordinate to the initial string of text data selected by the selection key; and means for highlighting those text strings on the display included in the determined range.

4. The device according to claim 3, wherein the means for highlighting highlights the text strings with the determined range using a shade that contrasts with a background of the display.

5. The device according to claim 3, wherein the means for highlighting highlights the text strings with the determined range with a color different from a background of the display.

6. The device according to claim 3, wherein text processing operations are performed on the highlighted text strings.

7. An electronic text creation device having a display with a limited display area and a keyboard with a limited number of keys corresponding to various text creation symbols for permitting an operator to create and store text in a hierarchy of text levels beginning with a highest hierarchical text level followed by one or more subordinate hierarchical text levels by selectively depressing the keys on the keyboard, comprising:

a text memory for storing strings of text data entered by the operator using the keyboard;

a text management memory having a hierarchy field corresponding to each string of text data for storing one of the hierarchical text levels and having a subordinate field for storing subordinate text information indicating whether a subsequent string of text data at a subordinate hierarchical text level exists;

a selection key on the keyboard actuable by the operator for selecting a hierarchical text level;

means for storing in the text memory, displaying, and managing strings of text data entered by the operator based on the corresponding hierarchical text levels and subordinate text information stored in the text management memory;

a data exchange memory connected to receive data stored in the text memory and text management memory; and an input/output terminal for connecting the data exchange to an external device, wherein the external device accesses data stored in the data exchange memory through the input/output terminal.

8. An electronic text creation and storage device having a display with a limited display area and a keyboard with a limited number of keys corresponding to various text creation symbols for permitting an operator to create and store text in a hierarchy of text levels beginning with a highest hierarchical text level followed by one or more subordinate hierarchical text levels by selectively depressing the keys on the keyboard, comprising:

a text memory for storing strings of text data entered by the operator using the keyboard;

a text management memory having a hierarchy field corresponding to each string of text data for storing one of the hierarchical text levels and having a subordinate field for storing a flag indicating whether a subsequent string of text data at a subordinate hierarchical text level exists;

a selection key on the keyboard actuable by the operator for selecting a hierarchical text level;

means for storing in the text memory strings of text data entered by the operator and for storing in the text management memory for each entered string of text data the selected hierarchical text level and a flag to indicate whether the entered string of text data is followed by a string of subordinate text data;

a display mode key for entering a first display mode where text at all hierarchical text levels is displayed and a second display mode where only text at the selected hierarchical text level is displayed; and means in response to entry of the second display mode for determining from the hierarchy field in the text management memory those text strings that correspond to the selected hierarchical level and displaying only those text strings retrieved from the text memory at the selected hierarchical level.

* * * * *